US010586380B2

(12) United States Patent
Ma et al.

(10) Patent No.: US 10,586,380 B2
(45) Date of Patent: *Mar. 10, 2020

(54) SYSTEMS AND METHODS FOR AUTOMATING THE ANIMATION OF BLENDSHAPE RIGS

(71) Applicant: Activision Publishing, Inc., Santa Monica, CA (US)

(72) Inventors: Wan-Chun Ma, Hsinchu (TW); Chongyang Ma, Los Angeles, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/299,916

(22) Filed: Oct. 21, 2016

(65) Prior Publication Data

US 2018/0033190 A1   Feb. 1, 2018

Related U.S. Application Data

(60) Provisional application No. 62/368,963, filed on Jul. 29, 2016.

(51) Int. Cl.
*G06T 15/50* (2011.01)
*G06T 13/40* (2011.01)
*G06K 9/00* (2006.01)

(52) U.S. Cl.
CPC ........ *G06T 15/503* (2013.01); *G06K 9/00302* (2013.01); *G06T 13/40* (2013.01)

(58) Field of Classification Search
CPC .... G06T 15/503; G06T 13/40; G06K 9/00302

USPC ........................................................ 345/473
See application file for complete search history.

(56) References Cited

U.S. PATENT DOCUMENTS

| 5,530,796 | A | 6/1996 | Wang |
| 5,561,736 | A | 10/1996 | Moore |
| 5,563,946 | A | 10/1996 | Cooper |
| 5,685,775 | A | 11/1997 | Bakoglu |
| 5,706,507 | A | 1/1998 | Schloss |

(Continued)

FOREIGN PATENT DOCUMENTS

| AU | 768367 | 3/2004 |
| AU | 2005215048 | 10/2011 |

(Continued)

OTHER PUBLICATIONS

Takahashi, et al., "A Three-Dimension Automatic Mesh Generation System Using Shape Recognition Technique", 1993.

(Continued)

*Primary Examiner* — Maurice L. McDowell, Jr.
(74) *Attorney, Agent, or Firm* — Novel IP

(57) ABSTRACT

The present specification describes systems and methods for automatically animating personalized blendshapes from three dimensional stereo reconstruction data. The disclosed inventions facilitate the animation of blendshapes using an optimization process that applies to a frame a fitting process to yield a set of weighted blendshapes and applies to that frame a temporal smoothing process to yield a another set of weighted blendshapes and repeats that optimization process for a predetermined number of iterations to yield a final set of weighted blendshapes.

22 Claims, 10 Drawing Sheets

(56) References Cited

U.S. PATENT DOCUMENTS

| | | |
|---|---|---|
| 5,708,764 A | 1/1998 | Borrel |
| 5,736,985 A | 4/1998 | Lection |
| 5,737,416 A | 4/1998 | Cooper |
| 5,745,678 A | 4/1998 | Herzberg |
| 5,762,552 A | 6/1998 | Vuong |
| 5,768,511 A | 6/1998 | Galvin |
| 5,825,877 A | 10/1998 | Dan |
| 5,835,692 A | 11/1998 | Cragun |
| 5,878,233 A | 3/1999 | Schloss |
| 5,883,628 A | 3/1999 | Mullaly |
| 5,900,879 A | 5/1999 | Berry |
| 5,903,266 A | 5/1999 | Berstis |
| 5,903,271 A | 5/1999 | Bardon |
| 5,911,045 A | 6/1999 | Leyba |
| 5,920,325 A | 7/1999 | Morgan |
| 5,923,324 A | 7/1999 | Berry |
| 5,969,724 A | 10/1999 | Berry |
| 5,977,979 A | 11/1999 | Clough |
| 5,990,888 A | 11/1999 | Blades |
| 6,014,145 A | 1/2000 | Bardon |
| 6,025,839 A | 2/2000 | Schell |
| 6,059,842 A | 5/2000 | Dumarot |
| 6,069,632 A | 5/2000 | Mullaly |
| 6,081,270 A | 6/2000 | Berry |
| 6,081,271 A | 6/2000 | Bardon |
| 6,091,410 A | 7/2000 | Lection |
| 6,094,196 A | 7/2000 | Berry |
| 6,098,056 A | 8/2000 | Rusnak |
| 6,104,406 A | 8/2000 | Berry |
| 6,111,581 A | 8/2000 | Berry |
| 6,134,588 A | 10/2000 | Guenthner |
| 6,144,381 A | 11/2000 | Lection |
| 6,148,328 A | 11/2000 | Cuomo |
| 6,179,713 B1 | 1/2001 | James |
| 6,185,614 B1 | 2/2001 | Cuomo |
| 6,201,881 B1 | 3/2001 | Masuda |
| 6,222,551 B1 | 4/2001 | Schneider |
| 6,271,842 B1 | 8/2001 | Bardon |
| 6,271,843 B1 | 8/2001 | Lection |
| 6,282,547 B1 | 8/2001 | Hirsch |
| 6,311,206 B1 | 10/2001 | Malkin |
| 6,334,141 B1 | 12/2001 | Varma |
| 6,336,134 B1 | 1/2002 | Varma |
| 6,337,700 B1 | 1/2002 | Kinoe |
| 6,353,449 B1 | 3/2002 | Gregg |
| 6,356,297 B1 | 3/2002 | Cheng |
| 6,411,312 B1 | 6/2002 | Sheppard |
| 6,426,757 B1 | 7/2002 | Smith |
| 6,445,389 B1 | 9/2002 | Bossen |
| 6,452,593 B1 | 9/2002 | Challener |
| 6,462,760 B1 | 10/2002 | Cox, Jr. |
| 6,466,550 B1 | 10/2002 | Foster |
| 6,469,712 B1 | 10/2002 | Hilpert, Jr. |
| 6,473,085 B1 | 10/2002 | Brock |
| 6,499,053 B1 | 12/2002 | Marquette |
| 6,505,208 B1 | 1/2003 | Kanevsky |
| 6,509,925 B1 | 1/2003 | Dermler |
| 6,525,731 B1 | 2/2003 | Suits |
| 6,549,933 B1 | 4/2003 | Barrett |
| 6,567,109 B1 | 5/2003 | Todd |
| 6,567,813 B1 | 5/2003 | Zhu |
| 6,618,751 B1 | 9/2003 | Challenger |
| RE38,375 E | 12/2003 | Herzberg |
| 6,657,617 B2 | 12/2003 | Paolini |
| 6,657,642 B1 | 12/2003 | Bardon |
| 6,684,255 B1 | 1/2004 | Martin |
| 6,717,600 B2 | 4/2004 | Dutta |
| 6,734,884 B1 | 5/2004 | Berry |
| 6,765,596 B2 | 7/2004 | Lection |
| 6,781,607 B1 | 8/2004 | Benham |
| 6,819,669 B2 | 11/2004 | Rooney |
| 6,832,239 B1 | 12/2004 | Kraft |
| 6,836,480 B2 | 12/2004 | Basso |
| 6,845,389 B1 | 1/2005 | Sen |
| 6,886,026 B1 | 4/2005 | Hanson |
| 6,948,168 B1 | 9/2005 | Kuprionas |
| RE38,865 E | 11/2005 | Dumarot |
| 6,963,824 B1 | 11/2005 | Davidson |
| 6,993,596 B2 | 1/2006 | Hinton |
| 7,006,616 B1 | 2/2006 | Christofferson |
| 7,028,296 B2 | 4/2006 | Irfan |
| 7,062,533 B2 | 6/2006 | Brown |
| 7,143,409 B2 | 11/2006 | Herrero |
| 7,196,705 B2 | 3/2007 | Gallivan |
| 7,209,137 B2 | 4/2007 | Brokenshire |
| 7,230,616 B2 | 6/2007 | Taubin |
| 7,249,123 B2 | 7/2007 | Elder |
| 7,263,511 B2 | 8/2007 | Bodin |
| 7,287,053 B2 | 10/2007 | Bodin |
| 7,305,438 B2 | 12/2007 | Christensen |
| 7,308,476 B2 | 12/2007 | Mannaru |
| 7,404,149 B2 | 7/2008 | Fox |
| 7,426,538 B2 | 9/2008 | Bodin |
| 7,427,980 B1 | 9/2008 | Partridge |
| 7,428,588 B2 | 9/2008 | Berstis |
| 7,429,987 B2 | 9/2008 | Leah |
| 7,436,407 B2 | 10/2008 | Doi |
| 7,439,975 B2 | 10/2008 | Hsu |
| 7,443,393 B2 | 10/2008 | Shen |
| 7,447,996 B1 | 11/2008 | Cox |
| 7,467,181 B2 | 12/2008 | McGowan |
| 7,475,354 B2 | 1/2009 | Guido |
| 7,478,127 B2 | 1/2009 | Creamer |
| 7,484,012 B2 | 1/2009 | Hinton |
| 7,503,007 B2 | 3/2009 | Goodman |
| 7,506,264 B2 | 3/2009 | Polan |
| 7,515,136 B1 | 4/2009 | Kanevsky |
| 7,525,964 B2 | 4/2009 | Astley |
| 7,552,177 B2 | 6/2009 | Kessen |
| 7,565,650 B2 | 7/2009 | Bhogal |
| 7,571,224 B2 | 8/2009 | Childress |
| 7,571,389 B2 | 8/2009 | Broussard |
| 7,580,888 B2 | 8/2009 | Ur |
| 7,596,596 B2 | 9/2009 | Chen |
| 7,640,587 B2 | 12/2009 | Fox |
| 7,667,701 B2 | 2/2010 | Leah |
| 7,698,656 B2 | 4/2010 | Srivastava |
| 7,702,784 B2 | 4/2010 | Berstis |
| 7,714,867 B2 | 5/2010 | Doi |
| 7,719,532 B2 | 5/2010 | Schardt |
| 7,719,535 B2 | 5/2010 | Tadokoro |
| 7,734,691 B2 | 6/2010 | Creamer |
| 7,737,969 B2 | 6/2010 | Shen |
| 7,743,095 B2 | 6/2010 | Goldberg |
| 7,747,679 B2 | 6/2010 | Galvin |
| 7,765,478 B2 | 7/2010 | Reed |
| 7,768,514 B2 | 8/2010 | Pagan |
| 7,773,087 B2 | 8/2010 | Fowler |
| 7,774,407 B2 | 8/2010 | Daly |
| 7,782,318 B2 | 8/2010 | Shearer |
| 7,792,263 B2 | 9/2010 | D Amora |
| 7,792,801 B2 | 9/2010 | Hamilton, II |
| 7,796,128 B2 | 9/2010 | Radzikowski |
| 7,808,500 B2 | 10/2010 | Shearer |
| 7,814,152 B2 | 10/2010 | McGowan |
| 7,827,318 B2 | 11/2010 | Hinton |
| 7,843,471 B2 | 11/2010 | Doan |
| 7,844,663 B2 | 11/2010 | Boutboul |
| 7,847,799 B2 | 12/2010 | Taubin |
| 7,856,469 B2 | 12/2010 | Chen |
| 7,873,485 B2 | 1/2011 | Castelli |
| 7,882,222 B2 | 2/2011 | Dolbier |
| 7,882,243 B2 | 2/2011 | Ivory |
| 7,884,819 B2 | 2/2011 | Kuesel |
| 7,886,045 B2 | 2/2011 | Bates |
| 7,890,623 B2 | 2/2011 | Bates |
| 7,893,936 B2 | 2/2011 | Shearer |
| 7,904,829 B2 | 3/2011 | Fox |
| 7,921,128 B2 | 4/2011 | Hamilton, II |
| 7,940,265 B2 | 5/2011 | Brown |
| 7,945,620 B2 | 5/2011 | Bou-Ghannam |
| 7,945,802 B2 | 5/2011 | Hamilton, II |
| 7,970,837 B2 | 6/2011 | Lyle |
| 7,970,840 B2 | 6/2011 | Cannon |

(56) References Cited

U.S. PATENT DOCUMENTS

| | | | |
|---|---|---|---|
| 7,985,138 B2 | 7/2011 | Acharya |
| 7,990,387 B2 | 8/2011 | Hamilton, II |
| 7,996,164 B2 | 8/2011 | Hamilton, II |
| 8,001,161 B2 | 8/2011 | Finn |
| 8,004,518 B2 | 8/2011 | Fowler |
| 8,005,025 B2 | 8/2011 | Bodin |
| 8,006,182 B2 | 8/2011 | Bates |
| 8,013,861 B2 | 9/2011 | Hamilton, II |
| 8,018,453 B2 | 9/2011 | Fowler |
| 8,018,462 B2 | 9/2011 | Bhogal |
| 8,019,797 B2 | 9/2011 | Hamilton, II |
| 8,019,858 B2 | 9/2011 | Bauchot |
| 8,022,948 B2 | 9/2011 | Garbow |
| 8,022,950 B2 | 9/2011 | Brown |
| 8,026,913 B2 | 9/2011 | Garbow |
| 8,028,021 B2 | 9/2011 | Reisinger |
| 8,028,022 B2 | 9/2011 | Brownholtz |
| 8,037,416 B2 | 10/2011 | Bates |
| 8,041,614 B2 | 10/2011 | Bhogal |
| 8,046,700 B2 | 10/2011 | Bates |
| 8,051,462 B2 | 11/2011 | Hamilton, II |
| 8,055,656 B2 | 11/2011 | Cradick |
| 8,056,121 B2 | 11/2011 | Hamilton, II |
| 8,057,307 B2 | 11/2011 | Berstis |
| 8,062,130 B2 | 11/2011 | Smith |
| 8,063,905 B2 | 11/2011 | Brown |
| 8,070,601 B2 | 12/2011 | Acharya |
| 8,082,245 B2 | 12/2011 | Bates |
| 8,085,267 B2 | 12/2011 | Brown |
| 8,089,481 B2 | 1/2012 | Shearer |
| 8,092,288 B2 | 1/2012 | Theis |
| 8,095,881 B2 | 1/2012 | Reisinger |
| 8,099,338 B2 | 1/2012 | Betzler |
| 8,099,668 B2 | 1/2012 | Garbow |
| 8,102,334 B2 | 1/2012 | Brown |
| 8,103,640 B2 | 1/2012 | Lo |
| 8,103,959 B2 | 1/2012 | Cannon |
| 8,105,165 B2 | 1/2012 | Karstens |
| 8,108,774 B2 | 1/2012 | Finn |
| 8,113,959 B2 | 2/2012 | De Judicibus |
| 8,117,551 B2 | 2/2012 | Cheng |
| 8,125,485 B2 | 2/2012 | Brown |
| 8,127,235 B2 | 2/2012 | Haggar |
| 8,127,236 B2 | 2/2012 | Hamilton, II |
| 8,128,487 B2 | 3/2012 | Hamilton, II |
| 8,131,740 B2 | 3/2012 | Cradick |
| 8,132,235 B2 | 3/2012 | Bussani |
| 8,134,560 B2 | 3/2012 | Bates |
| 8,139,060 B2 | 3/2012 | Brown |
| 8,139,780 B2 | 3/2012 | Shearer |
| 8,140,340 B2 | 3/2012 | Bhogal |
| 8,140,620 B2 | 3/2012 | Creamer |
| 8,140,978 B2 | 3/2012 | Betzler |
| 8,140,982 B2 | 3/2012 | Hamilton, II |
| 8,145,676 B2 | 3/2012 | Bhogal |
| 8,145,725 B2 | 3/2012 | Dawson |
| 8,149,241 B2 | 4/2012 | Do |
| 8,151,191 B2 | 4/2012 | Nicol, II |
| 8,156,184 B2 | 4/2012 | Kurata |
| 8,165,350 B2 | 4/2012 | Fuhrmann |
| 8,171,407 B2 | 5/2012 | Huang |
| 8,171,408 B2 | 5/2012 | Dawson |
| 8,171,559 B2 | 5/2012 | Hamilton, II |
| 8,174,541 B2 | 5/2012 | Greene |
| 8,176,421 B2 | 5/2012 | Dawson |
| 8,176,422 B2 | 5/2012 | Bergman |
| 8,184,092 B2 | 5/2012 | Cox |
| 8,184,116 B2 | 5/2012 | Finn |
| 8,185,450 B2 | 5/2012 | McVey |
| 8,185,829 B2 | 5/2012 | Cannon |
| 8,187,067 B2 | 5/2012 | Hamilton, II |
| 8,199,145 B2 | 6/2012 | Hamilton, II |
| 8,203,561 B2 | 6/2012 | Carter |
| 8,214,335 B2 | 7/2012 | Hamilton, II |
| 8,214,433 B2 | 7/2012 | Dawson |
| 8,214,750 B2 | 7/2012 | Hamilton, II |
| 8,214,751 B2 | 7/2012 | Dawson |
| 8,217,953 B2 | 7/2012 | Comparan |
| 8,219,616 B2 | 7/2012 | Dawson |
| 8,230,045 B2 | 7/2012 | Kawachiya |
| 8,230,338 B2 | 7/2012 | Dugan |
| 8,233,005 B2 | 7/2012 | Finn |
| 8,234,234 B2 | 7/2012 | Shearer |
| 8,234,579 B2 | 7/2012 | Do |
| 8,239,775 B2 | 8/2012 | Beverland |
| 8,241,131 B2 | 8/2012 | Bhogal |
| 8,245,241 B2 | 8/2012 | Hamilton, II |
| 8,245,283 B2 | 8/2012 | Dawson |
| 8,265,253 B2 | 9/2012 | D Amora |
| 8,310,497 B2 | 11/2012 | Comparan |
| 8,334,871 B2 | 12/2012 | Hamilton, II |
| 8,360,886 B2 | 1/2013 | Karstens |
| 8,364,804 B2 | 1/2013 | Childress |
| 8,425,326 B2 | 4/2013 | Chudley |
| 8,442,946 B2 | 5/2013 | Hamilton, II |
| 8,506,372 B2 | 8/2013 | Chudley |
| 8,514,249 B2 | 8/2013 | Hamilton, II |
| 8,554,841 B2 | 10/2013 | Kurata |
| 8,607,142 B2 | 12/2013 | Bergman |
| 8,607,356 B2 | 12/2013 | Hamilton, II |
| 8,624,903 B2 | 1/2014 | Hamilton, II |
| 8,626,836 B2 | 1/2014 | Dawson |
| 8,692,835 B2 | 4/2014 | Hamilton, II |
| 8,721,412 B2 | 5/2014 | Chudley |
| 8,827,816 B2 | 9/2014 | Bhogal |
| 8,838,640 B2 | 9/2014 | Bates |
| 8,849,917 B2 | 9/2014 | Dawson |
| 8,911,296 B2 | 12/2014 | Chudley |
| 8,922,553 B1* | 12/2014 | Tena .................... G06T 17/00 345/419 |
| 8,992,316 B2 | 3/2015 | Smith |
| 9,083,654 B2 | 7/2015 | Dawson |
| 9,152,914 B2 | 10/2015 | Haggar |
| 9,205,328 B2 | 12/2015 | Bansi |
| 9,286,731 B2 | 3/2016 | Hamilton, II |
| 9,299,080 B2 | 3/2016 | Dawson |
| 9,364,746 B2 | 6/2016 | Chudley |
| 9,442,564 B1* | 9/2016 | Dillon .................... G06F 3/012 |
| 9,525,746 B2 | 12/2016 | Bates |
| 9,583,109 B2 | 2/2017 | Kurata |
| 9,639,737 B2* | 5/2017 | Beeler .............. G06K 9/00214 |
| 9,652,890 B2* | 5/2017 | Beeler .................... G06T 17/20 |
| 9,682,324 B2 | 6/2017 | Bansi |
| 9,764,244 B2 | 9/2017 | Bansi |
| 9,789,406 B2 | 10/2017 | Marr |
| 9,808,722 B2 | 11/2017 | Kawachiya |
| 2004/0014514 A1 | 1/2004 | Yacenda |
| 2004/0228291 A1 | 11/2004 | Huslak |
| 2009/0113448 A1 | 4/2009 | Smith |
| 2009/0195545 A1* | 8/2009 | Debevec .................. G06T 13/40 345/473 |
| 2012/0062719 A1* | 3/2012 | Debevec .............. H04N 5/2251 348/77 |
| 2014/0043329 A1* | 2/2014 | Wang .................... G06T 17/20 345/420 |
| 2014/0160123 A1* | 6/2014 | Yang .................... G06T 17/00 345/420 |
| 2014/0344725 A1 | 11/2014 | Bates |
| 2015/0084950 A1* | 3/2015 | Li .................... G06K 9/00214 345/419 |
| 2015/0178988 A1* | 6/2015 | Montserrat Mora ... G06T 13/40 345/420 |
| 2016/0191671 A1 | 6/2016 | Dawson |
| 2017/0032055 A1* | 2/2017 | Eisemann .............. G06F 17/10 |
| 2017/0301125 A1* | 10/2017 | Bouaziz .................. G06T 13/40 |
| 2018/0197322 A1* | 7/2018 | Sagar .................... G06T 13/00 |

FOREIGN PATENT DOCUMENTS

| | | |
|---|---|---|
| CA | 2143874 | 6/2000 |
| CA | 2292678 | 7/2005 |
| CA | 2552135 | 7/2013 |
| CN | 1334650 A | 2/2002 |

(56) References Cited

FOREIGN PATENT DOCUMENTS

| | | |
|---|---|---|
| CN | 1202652 C | 10/2002 |
| CN | 1141641 C | 3/2004 |
| CN | 1494679 A | 5/2004 |
| CN | 1219384 | 9/2005 |
| CN | 1307544 | 3/2007 |
| CN | 100407675 | 7/2008 |
| CN | 100423016 C | 10/2008 |
| CN | 100557637 | 11/2009 |
| CN | 101001678 B | 5/2010 |
| CN | 101436242 | 12/2010 |
| CN | 101801482 B | 12/2014 |
| EP | 668583 | 8/1995 |
| EP | 0627728 B1 | 9/2000 |
| EP | 0717337 B1 | 8/2001 |
| EP | 1207694 A2 | 5/2002 |
| EP | 0679977 B1 | 10/2002 |
| EP | 0679978 B1 | 3/2003 |
| EP | 0890924 B1 | 9/2003 |
| EP | 1377902 B1 | 8/2004 |
| EP | 0813132 B1 | 1/2005 |
| EP | 1380133 B1 | 3/2005 |
| EP | 1021021 B1 | 9/2005 |
| EP | 0930584 B1 | 10/2005 |
| EP | 0883087 B1 | 8/2007 |
| EP | 1176828 B1 | 10/2007 |
| EP | 2076888 B1 | 7/2015 |
| GB | 2339938 | 10/2002 |
| GB | 2352154 | 7/2003 |
| JP | 3033956 B2 | 4/2000 |
| JP | 3124916 B2 | 1/2001 |
| JP | 3177221 B2 | 6/2001 |
| JP | 2001204973 A | 7/2001 |
| JP | 3199231 B2 | 8/2001 |
| JP | 3210558 B2 | 9/2001 |
| JP | 2001350802 A | 12/2001 |
| JP | 3275935 | 2/2002 |
| JP | 3361745 | 1/2003 |
| JP | 3368188 B2 | 1/2003 |
| JP | 3470955 B | 9/2003 |
| JP | 3503774 | 12/2003 |
| JP | 2004021773 A | 1/2004 |
| JP | 3575598 | 7/2004 |
| JP | 3579823 B | 7/2004 |
| JP | 3579154 B2 | 10/2004 |
| JP | 3701773 B2 | 10/2005 |
| JP | 3777161 | 3/2006 |
| JP | 3914430 B | 2/2007 |
| JP | 3942090 B | 4/2007 |
| JP | 3962361 | 5/2007 |
| JP | 4009235 B | 9/2007 |
| JP | 4225376 | 12/2008 |
| JP | 4653075 | 12/2010 |
| JP | 5063698 B | 8/2012 |
| JP | 5159375 B2 | 3/2013 |
| JP | 5352200 B2 | 11/2013 |
| JP | 5734566 B2 | 6/2015 |
| KR | 20020038229 A | 5/2002 |
| KR | 20030039019 A | 5/2003 |
| MY | 117864 A | 8/2004 |
| SG | 55396 | 12/1998 |
| TW | 424213 | 3/2001 |
| TW | 527825 | 4/2003 |
| TW | 200836091 | 9/2008 |
| TW | 200937926 | 9/2009 |
| TW | 201002013 | 1/2010 |
| TW | 201009746 | 3/2010 |
| TW | 201024997 | 7/2010 |
| TW | 201028871 | 8/2010 |
| WO | 0203645 A2 | 1/2002 |
| WO | 2002073457 | 9/2002 |
| WO | 20020087156 | 10/2002 |
| WO | 03049459 A1 | 6/2003 |
| WO | 03058518 A2 | 7/2003 |
| WO | 2004086212 | 10/2004 |
| WO | 2005079538 | 9/2005 |
| WO | 2007101785 | 9/2007 |
| WO | 2008037599 | 4/2008 |
| WO | 2008074627 | 6/2008 |
| WO | 2008095767 | 8/2008 |
| WO | 2009037257 | 3/2009 |
| WO | 2009104564 | 8/2009 |
| WO | 2010096738 A1 | 8/2010 |

OTHER PUBLICATIONS

Taghavi, Reza, "Automatic Block Decomposition Using Fuzzy Logic Analysis", 9.sup.th International Meshing Roundtable, New Orleans, Louisiana, Oct. 2000.
"An Approach for Eliminating Self-Intersecting Recognition Models for Hexahedral Mesh Generation," 2003, pp. 1-14.
Deetwester et al. "Indexing by Latent Semantic Analysis," 1990, pp. 1-34.
Office Action dated Apr. 4, 2018 for U.S. Appl. No. 15/299,882 (pp. 1-18).
Supplementary European Search from the European Patent Office for EP05723458.5, dated Jul. 19, 2010.
International Search Report as Published as WO2005/079538 in corresponding international application No. PCT/US2005/005550. dated Jul. 5, 2006.

* cited by examiner

SYSTEMS AND METHODS FOR AUTOMATING THE ANIMATION OF BLENDSHAPE RIGS

CROSS-REFERENCE TO PRIORITY APPLICATION

The present specification relies on U.S. Patent Provisional Application No. 62/368,963, entitled "Systems and Methods for Automating and Streamlining Real-Time Modifications to Blendshape Rigs" and filed on Jul. 29, 2016, for priority. The aforementioned application is incorporated herein by reference in its entirety.

FIELD

The present specification is related generally to the field of animation and computer graphics. More specifically the present specification is related to a method for automatically generating and dynamically personalizing blendshapes, based on the modulation of parameters which are controlled via a graphical interface, while preserving the underlying semantics of a template facial animation.

BACKGROUND

Achieving a digital double which can replicate the facial appearance and motion of a real actor requires a facial animation rig which can reproduce the shape a real face traverses as it moves. Digital double face rigs typically incorporate a neutral pose geometry derived from a high-quality 3D scan of the actor's face, along with a collection of blendshapes which are based on reference and/or scans of the actor's face in a variety of poses.

Blendshapes are combined with a base shape, thereby deforming the base shape, to achieve numerous pre-defined shapes and various combinations in-between. The base shape, such as a single mesh, is the default shape (an expressionless face for example). Various expressions, such as smiling, laughing, frowning, growling, yelling, closed eyes, open eyes, heightened eyebrows, lowered eyebrows, pursed lips, and mouth shapes of vowels or consonants, blend or morph into the base shape and, in so doing, are referred to as blendshapes or morph targets. For purposes of this specification, the term blendshape and morph target shall be used interchangeably.

Collections of blendshapes are linked to the neutral base shape by a blend node, operator or modifier. The intensity for each shape that is linked to the base shape can be modified, thereby linearly increasing or decreasing the prominence of that shape in the image. An animator can then "turn up" or "turn down" the blendshape poses, and the base shape will animate to partially or fully assume the target shape to form the desired expression.

Using this method, animators can mix and match blendshapes to form any number of combinations between the prepared and linked blendshapes. A raised eyebrow can be mixed with a grin to form a quizzical expression. A blendshape with a frown can be mixed with downward eyebrows eyes to form an angry expression or a look of disapproval. For maximum flexibility, artists will often breakdown and create isolated expressions (blendshapes) just for each individual facial component (nose, eyes, eyelids, eyebrows, and mouth) and even those expressions may be further divided into left and right versions thereof, affecting only the left or right portions of the face.

To span a sufficient array of actor-specific facial expressions which is consistent across human faces, this collection of blendshapes is usually designed to isolate muscle group action units according to the Facial Action Coding System (FACS). Combinations of these shapes are actuated by controls which are exposed to an animator and/or driven by performance capture data.

There are several challenges associated with trying to obtain the basis expressions from captured poses of an actor's face. First, rigid head movement must be factored out to yield face motion in a common coordinate system for basis selection or animation curve solving. Rigid head transforms may be estimated from the movement of a rigid object attached to the performer's head, but such estimates suffer when the attached object moves relative to the head during large accelerations. Rigid head transforms may also be estimated from a set of facial markers which exhibit minimal motion compared to the rest of the face; however, they do not truly remain still during a performance.

Second, there is the question of what constitutes an appropriate "base" or "neutral" pose. On the acquisition side, this should be a relaxed facial expression which the actor can hold, as well as reproduce consistently across scanning sessions and/or modes of capture. However in reality the actor is unlikely to produce the same relaxed facial expression from shot to shot, therefore it is difficult to judge which one is the "true" base pose. Crucially, several of the desired poses may be difficult for some or all individuals to perform. Furthermore, even easy-to-perform expressions are impractical to achieve in isolation. For example, a captured open jaw expression might contain 5% of an upper eyebrow raised expression. The captured shapes have to be carefully processed by manually painting out any undesirable motion, in order to produce clean basis shapes.

Significant production time is spent decomposing retopologized face shapes into localized, meaningful poses. The quality of the results will depend highly on the skill of the artist. An ideal decomposition relies on the artist's foresight into how the basis shapes, prepared individually, will combine during animation.

For facial rigging and animation, bone-based and blendshape rigs are the two most typical representations in use. Bone-based rigs allow affine deformation, however it is non-trivial to build a bone-based rig based on facial measurements as deriving optimal skinning weights and bone locations is non-trivial. In addition, even under the assumption that the skinning weights and bone locations are known, referring joint transformations based on positional constraints is essentially an inverse kinematics problem, which could lead to multiple solutions. Blendshape rigs, on the other hand, are much easier to work with individual facial captures. However, they typically do not incorporate rotations. In addition, the nature of the blendshape lures digital artists to add more shapes for a better approximation of non-linear deformation; nevertheless this could end up with introducing linearly dependent shapes and resulting in confusing facial solving results.

Linear blendshape models have been adopted for many facial animation applications. However, a major disadvantage of various prior art approaches is that it is a holistic model and all the components therein are related to each other and have global support. This makes it difficult to focus on, and isolate, localized deformations. There are attempts to automatically discover localized facial action units by dividing a human face into several clusters based on analyzing the motion data or inducing sparsity. Nevertheless, there are two major issues that make these data-driven methods impractical for production use. Firstly, they require a substantial amount of data to adequately train a facial deformation model. Secondly, since the animation model is data-driven, it is difficult to obtain consistent results (for example, segmentations and/or corresponded motions) across different subjects. There are methods to model out-of-span deformations as correctives, but these approaches do not alter the rig itself, and the extra shapes are difficult to interpret if further editing is desired.

There is therefore a need for a method and system that addresses the above challenges in producing digital double facial animation rigs. Such a system should be able to produce a set of blendshapes capable of reproducing input performances captured for a given actor, while conforming to general semantics such that the rigs produced for each actor behave consistently in the hands of an animator. Additionally, there is a need for methods and systems that provide an easy, dynamic approach to modifying a generated blendshape rig, based upon a predefined set of scalar parameters that would enable a user to readily generate new blendshape rigs as desired. Further, there is a need for methods and systems that can iteratively, automatically generate desired blendshapes from an actor's performance and a database of existing blendshape templates.

SUMMARY

The present specification describes a method for automatically generating personalized blendshapes from actor performance measurements, while preserving the semantics of a template facial animation rig. The present method facilitates creation of an ensemble of realistic digital double face rigs for each individual with consistent behaviour across the set. The present specification also provides processes for blendshape refinement and optimizations. Furthermore the present specification discloses methods and systems that provide an easy, dynamic approach to modifying a generated blendshape rig, based upon a predefined set of scalar parameters that would enable a user to readily generate new blendshape rigs as desired and that can iteratively, automatically generate desired blendshapes from an actor's performance and a database of existing blendshape templates.

In some embodiments, the present specification discloses a computer-implemented method for generating and dynamically modifying a blendshape within a graphical user interface rendered in a display, said method being implemented in a computer having a minimum clock speed of 2.6 GHz and a minimum random access memory of 2 gigabytes wherein said computer is in data communication with the display and with a storage unit, the method comprising: acquiring from the storage unit a plurality of template blendshapes, wherein each template blendshape is defined by data representative of a plurality of vertices and relationships between said vertices that, when rendered onto said display, visually represent at least one facial expression; acquiring a plurality of facial expression measurements, wherein each facial expression measurement is defined by data representative of at least one facial expression captured from a physical performance by an actor; using said computer and at least a portion of said plurality of facial expression measurements to generate an initial blendshape; executing an iterative optimization process, within said computer, for generating an output blendshape, wherein said iterative optimization process applies to the initial blendshape a plurality of transformations based upon a first variable associated with a degree of sparseness, a second variable associated with a degree of temporal smoothness, a third variable associated with a degree of deformation regularization, and a fourth variable associated with a degree of direction of motion regularization and wherein said iterative optimization process iteratively adjusts each of said first, second, third, and fourth variable to generate said output blendshape and/or output weights and/or rigid motions associated with the blendshape.

Optionally, the computer-implemented method further comprises displaying a first icon on said display, wherein said first icon is adapted to be manipulated and wherein, upon a manipulation, the first variable is modified, thereby causing the degree of sparseness to increase or decrease.

Optionally, the computer-implemented method further comprises displaying a second icon on said display, wherein said second icon is adapted to be manipulated and wherein, upon a manipulation, the second variable is modified, thereby causing the degree of temporal smoothness to increase or decrease.

Optionally, the computer-implemented method further comprises displaying a third icon on said display, wherein said third icon is adapted to be manipulated and wherein, upon a manipulation, the third variable is modified, thereby causing the degree of deformation regularization to increase or decrease.

Optionally, the computer-implemented method further comprises displaying a fourth icon on said display, wherein said fourth icon is adapted to be manipulated and wherein, upon a manipulation, the fourth variable is modified, thereby causing the degree of direction of motion regularization to increase or decrease.

Optionally, at least one of said plurality of transformations factors out rigid motion when computing a plurality of weights.

Optionally, the output blendshape, $x_i$, is defined by $$\min_{w_i, R_i, t_i, D, b_0} \sum_{i=1}^{n_f} E_g^i, \tag{2}$$

where $$E_g^i = \|M_i(x_i - p_i)\|^2,$$

$$x_i = (I_{n_v} \otimes R_i)(Dw_i + b_0) + (1_{n_v} \otimes t_i).$$

wherein the initial blendshape is defined by a pose offset D, a neutral pose $b_0$, and blendshape weights $w_i$, wherein rotation and translation $t_i$ represent rigid motion at an $i^{th}$ frame, wherein $p_i$ is data representing at least a portion of said plurality of facial expression measurements, wherein $M_i$ is a square diagonal matrix where each diagonal element stores a matching confidence value of each vertex, wherein $I_{n_v}$ is an identity matrix with a size equal to a number of vertices $n_v$, and wherein $1_{n_v}$ is a column vector of ones with a length of $n_v$.

Optionally, the output blendshape relative to a target facial expression has an average fitting error of less than 1.8 mm.

Optionally, the target facial expression is at least one of a smile, a laugh, a frown, a growl, a yell, closed eyes, open eyes, heightened eyebrows, lowered eyebrows, pursed lips, a mouth shape of a vowel, and a mouth shape of a consonant.

In some embodiments, the present specification discloses a computer-implemented method for generating and dynamically modifying a blendshape within a graphical user interface rendered in a display, said method being implemented in a computer having a minimum clock speed of 2.6 GHz and a minimum random access memory of 2 gigabytes wherein said computer is in data communication with the display and with a storage unit, the method comprising: acquiring from the storage unit a plurality of template blendshapes, wherein each template blendshape is defined by data representative of a plurality of vertices and relationships between said vertices that, when rendered onto said display, visually represent at least one facial expression; acquiring a plurality of facial expression measurements, wherein each facial expression measurement is defined by data representative of at least one facial expression captured from a physical performance by an actor; using said computer and at least a portion of said plurality of facial expression measurements to generate an initial blendshape; executing an iterative optimization process, within said computer, for generating an output blendshape, wherein said iterative optimization process applies to the initial blendshape at least one of a first transformation indicative of a degree of sparseness, a second transformation indicative of a degree of temporal smoothness, a third transformation indicative of a degree of deformation regularization, and a fourth transformation indicative of a degree of direction of motion regularization and wherein said iterative optimization process iteratively executes at least one of said first transformation, second transformation, third transformation, and fourth transformation to generate said output blendshape and/or output weights and/or rigid motions associated with the blendshape. Optionally, the output blendshape is rendered on the display.

Optionally, the computer-implemented method further comprises displaying an icon on said display, wherein said icon is adapted to be manipulated and wherein, upon a manipulation, the first transformation is modified, thereby causing the degree of sparseness to increase or decrease.

Optionally, the computer-implemented method further comprises displaying an icon on said display, wherein said icon is adapted to be manipulated and wherein, upon a manipulation, the second transformation is modified, thereby causing the degree of temporal smoothness to increase or decrease.

Optionally, the computer-implemented method further comprises displaying an icon on said display, wherein said icon is adapted to be manipulated and wherein, upon a manipulation, the third transformation is modified, thereby causing the degree of deformation regularization to increase or decrease.

Optionally, the computer implemented method further comprises displaying an icon on said display, wherein said icon is adapted to be manipulated and wherein, upon a manipulation, the fourth transformation is modified, thereby causing the degree of direction of motion regularization to increase or decrease.

In some embodiments, the present specification discloses a computer readable non-transitory medium comprising a plurality of executable programmatic instructions wherein, when said plurality of executable programmatic instructions are executed by a processor, a process for generating and dynamically modifying a blendshape within a graphical user interface rendered in a display is performed, said plurality of executable programmatic instructions comprising: programmatic instructions, stored in said computer readable non-transitory medium, for acquiring from a storage unit a plurality of template blendshapes, wherein each template blendshape is defined by data representative of a plurality of vertices and relationships between said vertices that, when rendered onto said display, visually represent at least one facial expression; programmatic instructions, stored in said computer readable non-transitory medium, for acquiring a plurality of facial expression measurements, wherein each facial expression measurement is defined by data representative of at least one facial expression captured from a physical performance by an actor; programmatic instructions, stored in said computer readable non-transitory medium, for generating an initial blendshape using at least a portion of said plurality of facial expression measurements; programmatic instructions, stored in said computer readable non-transitory medium, for executing an iterative optimization process in order to generate an output blendshape, wherein said iterative optimization process applies to the initial blendshape a plurality of transformations based upon a first variable associated with a degree of sparseness, a second variable associated with a degree of temporal smoothness, a third variable associated with a degree of deformation regularization, and a fourth variable associated with a degree of direction of motion regularization and wherein said iterative optimization process iteratively adjusts each of said first, second, third, and fourth variable to generate said output blendshape; programmatic instructions, stored in said computer readable non-transitory medium, for outputting said blendshape and/or weights and/or rigid motions associated with the blendshape; and programmatic instructions, stored in said computer readable non-transitory medium, for displaying at least one of: a first icon, wherein said first icon is adapted to be manipulated and wherein, upon a manipulation, the first variable is modified, thereby causing the degree of sparseness to increase or decrease; a second icon, wherein said second icon is adapted to be manipulated and wherein, upon a manipulation, the second variable is modified, thereby causing the degree of temporal smoothness to increase or decrease; a third icon, wherein said third icon is adapted to be manipulated and wherein, upon a manipulation, the third variable is modified, thereby causing the degree of deformation regularization to increase or decrease; and fourth icon on said display, wherein said fourth icon is adapted to be manipulated and wherein, upon a manipulation, the fourth variable is modified, thereby causing the degree of direction of motion regularization to increase or decrease.

Optionally, each of said first icon, second icon, third icon, and fourth icon are concurrently displayed on said display.

Optionally, at least one of said plurality of transformations factors out rigid motion when computing a plurality of weights.

Optionally, the computer readable non-transitory medium further comprises a plurality of programmatic instructions to define the output blendshape, $x_i$, by executing:

$$\min_{w_i, R_i, t_i, D, b_0} \sum_{i=1}^{n_f} E_g^i, \qquad (2)$$

where $$E_g^i = \|M_i(x_i - p_i)\|^2,$$

$$x_i = (I_{n_v} \otimes R_i)(Dw_i + b_0) + (1_{n_v} \otimes t_i).$$

wherein the initial blendshape is defined by a pose offset D, a neutral pose $b_0$, and blendshape weights $w_i$, wherein rotation and translation $t_i$ represent rigid motion at an $i^{th}$ frame, wherein $p_i$ is data representing at least a portion of said plurality of facial expression measurements, wherein $M_i$ is a square diagonal matrix where each diagonal element stores a matching confidence value of each vertex, wherein $I_{nv}$ is an identity matrix with a size equal to a number of vertices $n_v$, and wherein $1_{nv}$ is a column vector of ones with a length of $n_v$.

Optionally, the output blendshape relative to a target facial expression has an average fitting error of less than 1.8 mm.

In some embodiments, the present specification discloses a computer readable non-transitory medium comprising a plurality of executable programmatic instructions wherein, when said plurality of executable programmatic instructions are executed by a processor, a process for generating and dynamically modifying a blendshape, said plurality of executable programmatic instructions comprising: programmatic instructions, stored in said computer readable non-transitory medium, for acquiring from a storage unit a plurality of template blendshapes, wherein, when rendered onto said display, each of said plurality of template blendshapes visually represent at least one facial expression; programmatic instructions, stored in said computer readable non-transitory medium, for acquiring a plurality of facial expression measurements; programmatic instructions, stored in said computer readable non-transitory medium, for generating an initial blendshape using at least a portion of said plurality of facial expression measurements; programmatic instructions, stored in said computer readable non-transitory medium, for executing an iterative optimization process in order to generate an output blendshape, wherein said iterative optimization process applies to the initial blendshape at least one of a first transformation indicative of a degree of sparseness, a second transformation indicative of a degree of temporal smoothness, a third transformation indicative of a degree of deformation regularization, and a fourth transformation indicative of a degree of direction of motion regularization and wherein said iterative optimization process iteratively executes at least one of said first transformation, second transformation, third transformation, and fourth transformation to generate said output blendshape; programmatic instructions, stored in said computer readable non-transitory medium, for generating said output blendshape and/or outputting weights and/or rigid motions associated with the blendshape; and programmatic instructions, stored in said computer readable non-transitory medium, for displaying at least one of: a first icon, wherein said first icon is adapted to be manipulated and wherein, upon a manipulation, the first transformation is modified, thereby causing the degree of sparseness to increase or decrease; a second icon, wherein said second icon is adapted to be manipulated and wherein, upon a manipulation, the second transformation is modified, thereby causing the degree of temporal smoothness to increase or decrease; a third icon, wherein said third icon is adapted to be manipulated and wherein, upon a manipulation, the third transformation is modified, thereby causing the degree of deformation regularization to increase or decrease; and fourth icon on said display, wherein said fourth icon is adapted to be manipulated and wherein, upon a manipulation, the fourth transformation is modified, thereby causing the degree of direction of motion regularization to increase or decrease.

In some embodiments, the present specification discloses a computer-implemented method for animating a plurality of blendshapes within a graphical user interface rendered in a display, said method being implemented in a computer having a minimum clock speed of 2.6 GHz and a minimum random access memory of 2 gigabytes wherein said computer is in data communication with the display and with a storage unit, the method comprising: acquiring from the storage unit the plurality of blendshapes, wherein each one of said plurality of blendshapes is defined by data representative of a plurality of vertices and relationships between said vertices that, when rendered onto said display, visually represent at least one facial expression; acquiring a plurality of frames from at least two cameras and a plurality of calibration information defining a relative position of each of said at least two cameras; generating a three dimensional stereo reconstruction based upon plurality of frames and said plurality of calibration information; using said computer, at least a portion of said plurality of blendshapes, and at least a portion of said three dimensional stereo reconstruction, determine a correspondence between each of said plurality of vertices in each of said plurality of blendshapes with a position on said three dimensional stereo reconstruction on a frame by frame basis; executing an optimization process, within said computer, for generating an animated set of blendshapes, wherein said optimization process applies to a frame a first fitting process to yield a first set of weighted blendshapes and applies to said frame a temporal smoothing process to yield a second set of weighted blendshapes, wherein the first set of weighted blendshapes is modified during the temporal smoothing process to yield the second set of weighted blendshapes; repeating the optimization process for a predetermined number of iterations to yield a final set of weighted blendshapes; and using the final set of weighted blendshapes to render the animated blendshape on said display.

Optionally, the plurality of blendshapes are generated by acquiring from the storage unit a plurality of template blendshapes, wherein each template blendshape is defined by data representative of a plurality of vertices and relationships between said vertices that, when rendered onto said display, visually represent at least one facial expression; acquiring a plurality of facial expression measurements, wherein each facial expression measurement is defined by data representative of at least one facial expression captured from a physical performance by an actor; using said computer and at least a portion of said plurality of facial expression measurements to generate an initial blendshape; executing an iterative optimization process, within said computer, for generating an output blendshape, wherein said iterative optimization process applies to the initial blendshape a plurality of transformations based upon a first variable associated with a degree of sparseness, a second variable associated with a degree of temporal smoothness, a third variable associated with a degree of deformation regularization, and a fourth variable associated with a degree of direction of motion regularization and wherein said iterative optimization process iteratively adjusts each of said first, second, third, and fourth variable to generate said output blendshape and/or output weights and/or rigid motions associated with the blendshape.

Preferably, each one of the plurality of blendshapes comprises the same number of vertices.

Optionally, each one of the plurality of blendshapes has a minimum of 1,000 vertices.

Optionally, said correspondence is determined by using said computer to interpolate each of said plurality of blendshapes linearly and determine a closest point on the three dimensional stereo reconstruction for each vertex in the each of the plurality of blendshapes.

The aforementioned and other embodiments of the present shall be described in greater depth in the drawings and detailed description provided below.

BRIEF DESCRIPTION OF THE DRAWINGS

These and other features and advantages of the present specification will be further appreciated, as they become better understood by reference to the detailed description when considered in connection with the accompanying drawings.

DETAILED DESCRIPTION

The present specification describes an improved method for producing digital double facial animation rigs. In one embodiment, the method of present specification is used to produce a set of blendshapes capable of reproducing input performances captured for a given actor, while conforming to general semantics such that the rigs produced for each actor behave consistently in the hands of an animator.

In one embodiment, the present method uses a database of blendshapes, created by professional artists, as a standard to define the fundamental deformations of a human face. Based on this standard, the present method computes the blendshapes which can best replicate the deformations of a specific actor's face in terms of those semantics. In one embodiment, the present technique is used for producing digital-double facial animation rigs from live actors.

In one embodiment, the system and method of the present specification provides an end-to-end framework from character acquisition to facial rig production. The present system captures high resolution geometry and textures, provides corresponded facial geometry forever pose being captured, and generates production-ready blendshape models.

In one embodiment, a general set of blendshapes is optimally deformed in a non-rigid fashion such that they can better fit input performances, while maintaining the semantics of each general blendshape. The present method demonstrates improved fidelity of performance capture and transfer via personalized shapes with consistent semantics.

The present specification is directed towards multiple embodiments. The following disclosure is provided in order to enable a person having ordinary skill in the art to practice the specification. Language used in this specification should not be interpreted as a general disavowal of any one specific embodiment or used to limit the claims beyond the meaning of the terms used therein. The general principles defined herein may be applied to other embodiments and applications without departing from the spirit and scope of the specification. Also, the terminology and phraseology used is for the purpose of describing exemplary embodiments and should not be considered limiting. Thus, the present specification is to be accorded the widest scope encompassing numerous alternatives, modifications and equivalents consistent with the principles and features disclosed. For purpose of clarity, details relating to technical material that is known in the technical fields related to the specification have not been described in detail so as not to unnecessarily obscure the present specification.

It should be noted herein that any feature or component described in association with a specific embodiment may be used and implemented with any other embodiment unless clearly indicated otherwise.

Figure 1:
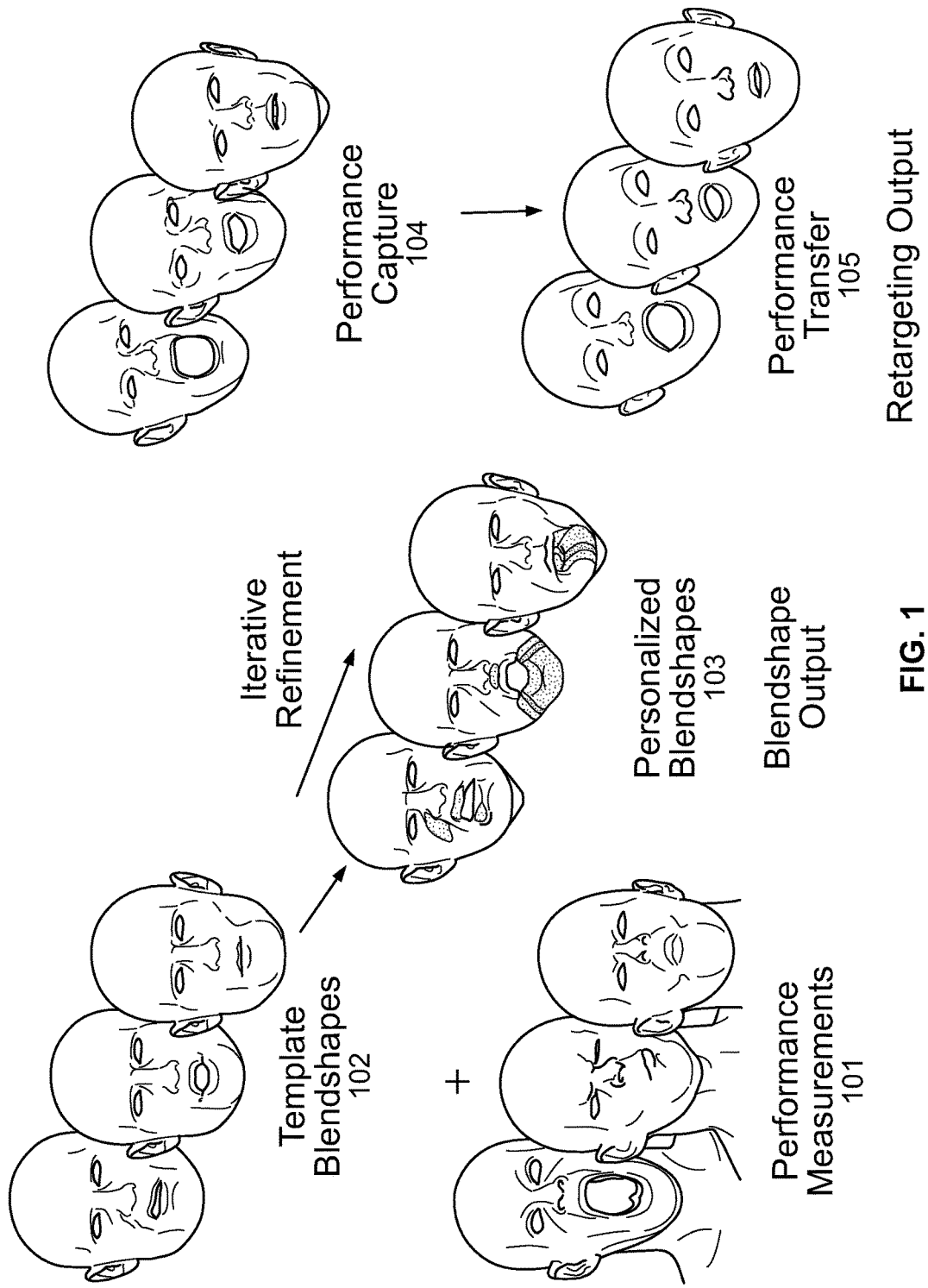
FIG. 1 illustrates an overview of the method of generating personalized blendshape models, according to one embodiment of the present specification.

FIG. 1 illustrates an overview of the method of generating personalized blendshape models, according to one embodiment of the present specification. Referring to FIG. 1, measurements of various facial movements and expressions of an individual are made, as shown in 101. These facial performance measurements are applied to pre-made, templated blendshape models or basis shapes created by artists 102. In one embodiment, the blendshape models are adopted to corresponding facial performance measurements by non-rigidly deforming basis shapes, thus yielding personalized blendshapes 103. The personalized blendshapes are then iteratively and recursively refined over multiple dimensions, preferably four as further described below, and an output is generated. The output of the optimized blendshapes is also illustrated in 103. The result may then be retargeted to a different character, as shown in 104 and 105. To the extent required, the iterative process is repeated until a desired output is achieved. In one embodiment, the iterative process is repeated until the final output 105 achieves an average fitting error threshold level. That average fitting error is determined by comparing the output, on a frame by frame basis, to the captured performance, determining the differences on a line-by-line, curve-by-curve, and/or node-by-node basis and average the differences to yield an average fitting error, expressed in terms of distance units. The fitting error threshold level may be defined in a number of ways, including 1) where the fitting error plateaus relative to prior fitting errors and additional iterations does not improve the fitting error or 2) where the fitting error achieves an absolute desired average fitting error level, such as 1.6 mm or below, preferably 1.2 mm or below. The resulting outputs are personalized blendshape models that accurately reflect the input performances, preserve the semantics of a templated artist-created blendshape model, and behave consistently even when they are personalized to the performances of different actors.

Figure 2:
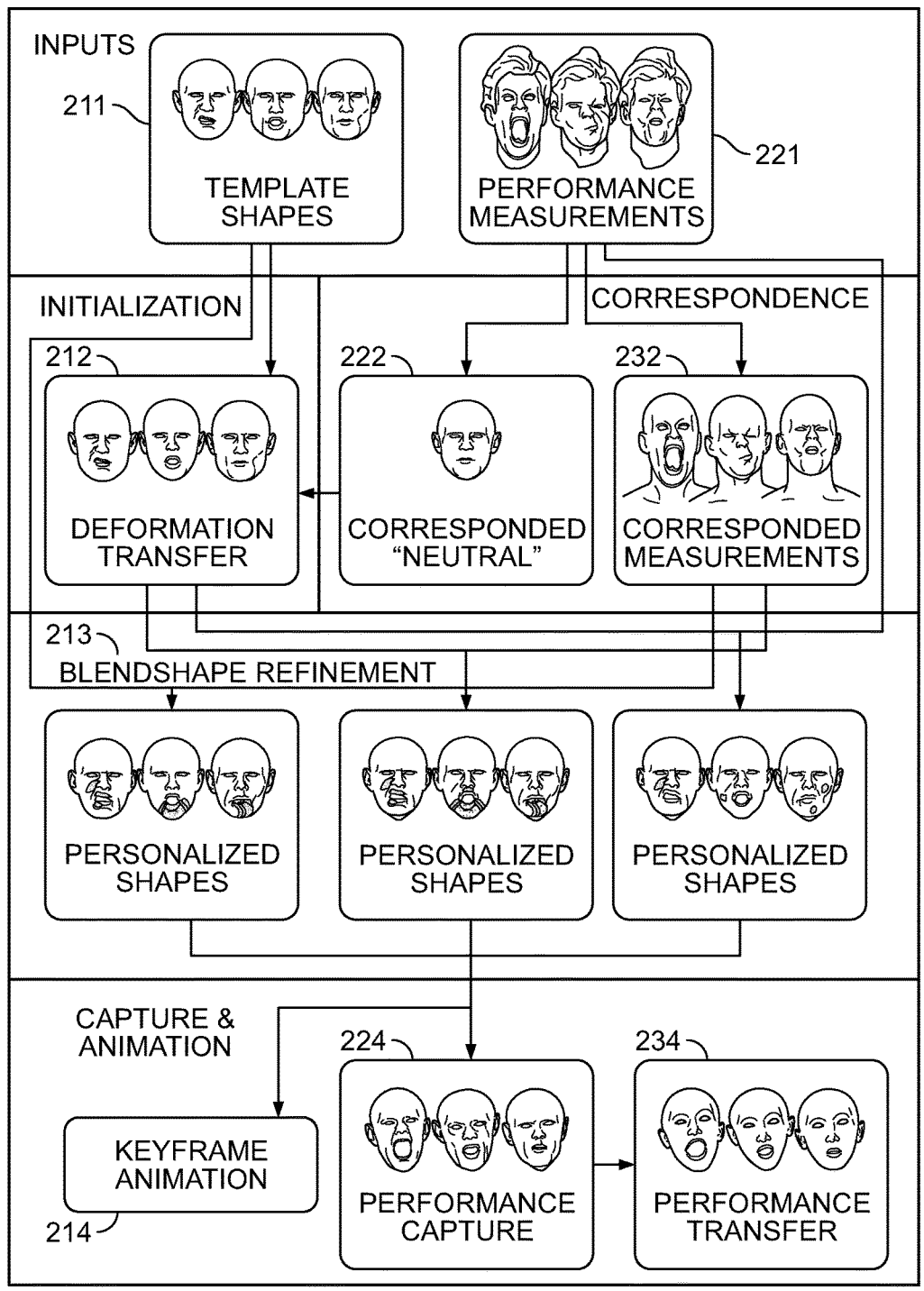
FIG. 2 illustrates the process of generating personalized blendshape rigs, in accordance with an embodiment of the present specification.

FIG. 2 illustrates another view of how personalized blendshape rigs are generated. Referring to FIG. 2, the inputs to the process are template shapes 211 and facial performance measurements which have been captured from an actor's performance 221. The facial performance measurements are transformed into corresponding measurements 232 and corresponding neutral template 222. The template shapes 211 are initialized and adopted to the corresponded neutral 222 by non-rigid deformation, to yield initial blendshapes 212. Thereafter, the initial blendshapes undergo iterative refinement 213 to yield output blendshapes. The output blendshapes can be used for performance capture and animation applications, including key frame animation 214 and performance capture 224, which can be further used for performance transfer 234 to the blendshape.

In all embodiments herein, it should be appreciated that the process is implemented on a computer having a minimum CPU clock speed of 2.6 GHz and a minimum number of 2 cores. The preferred minimum amount of local RAM is 2 GB. It is further preferred that the computer is in data communication with at least one database that adapted to store the template shapes 211 and facial performance measurements which have been captured from an actor's performance 221. Additionally, a display is in data communication with the processor and preferably that display has a minimum screen resolution of 800×600.

Facial Capture and Correspondence

It is apparent from the above discussion that blendshape personalization requires performance measurements of the individual as input, towards which the blendshapes are optimized. In one embodiment, these measurements may be discrete poses, or frames of a performance. The apparatus for capturing these input measurements for subsequent blendshape optimization includes, in one embodiment, an array of 35 image sensors or cameras. Exemplary cameras include monochrome global shutter machine vision cameras (such as by XimeaxiQ), with a resolution of 4M pixels each, synchronized at 75 Hz. The cameras are mounted in a lighting apparatus as is known to persons of ordinary skill in the art.

To capture all the target facial expressions, the actor performs series of poses, returning to a neutral rest pose in between each. In one embodiment, the duration of each single pose capture ranges from 1 to 2 seconds. A typical range-of-motion (ROM) capture session contains about 60 video sequences. In one embodiment, camera parameters may be computed with any suitable commercial photogrammetry software.

As explained with reference to FIG. 2, after performance capture, correspondence is established. In one embodiment, to establish the correspondence, the transition from neutral to each pose is tracked by deforming a tracking mesh. The mesh itself corresponds to the template blendshapes. In one embodiment, an optimization is employed to track the motion by directly solving for the mesh at each frame using Laplacian deformation with barycentric coordinates, guided by three different levels of image-based correspondences in a coarse-to-fine fashion. These three levels of image based correspondences are:

1. Face Features—In one embodiment, an open-source face detector and facial features predictor is used, which provides a robust way to initialize the correspondence search at the coarsest level. Currently, an exemplary, publicly available feature database has a 68 landmark model of which 51 can be used as surface matches.
2. Sparse Robust Image Features—In one embodiment, a feature classifier, like publicly available SIFT, is used to conduct intermediate matches for features. The classifier requires tuning multiple parameters, such as search region, descriptor distance threshold, peak threshold and edge threshold. In one embodiment, the peak and edge threshold are selected to obtain more than 10000 features per view. The method of present specification iterates matching and mesh registration multiple times to gradually increase the number of matches by simultaneously reducing the search region and increasing the descriptor distance threshold and the regularization coefficient. The rate of change of these parameters is set to double the number of matches at each iteration. The search region is applied first, only considering potential matches in a square region around the expected position, which is updated at every iteration. The initial expected position is computed from a face feature mesh estimation, such as the 51 face features listed above, and the initial region has a predefined pixel width, such as 100 to 300 pixels wide. The best match inside this region must meet a predefined descriptor distance threshold, such as 100 units using the publicly available Open CV implementation units. The search region is then halved and the descriptor distance threshold is increased, such as by 50 units, at every iteration. Iterations stop after obtaining more than 1000 matches by merging the matches from all views. These parameters are fixed across various subjects.
3. Dense Optical Flow Matches. At the finest level, the method of present specification uses optical flow to establish dense correspondence. In one embodiment, the optical flow process computes inter-frame motion from the images of each camera. It proceeds from coarse to fine using a Gaussian image pyramid. The local 2D search is done by using normalized cross correlation (NCC) with bicubic filtering for subpixel matching. The filtering leverages the reconstructed 3D surface to avoid smoothing across discontinuous boundaries (e.g. occlusion). The 2D feature matching is initialized by the estimated motion from a coarser level of detail or a previous iteration. In one embodiment, the registered mesh at the current iteration is used to render a dense motion field using hardware accelerated rasterization. This motion field is then employed as a guide to reduce search regions for the next level.

Registration

After obtaining a tracking mesh that is registered to the source frame, feature matches from each view, calibrated camera data, and 3D surface reconstruction surfaces, the process of present specification estimates the registration for the target frame. The present method is used both for registering a single global neutral mesh to the first frame of every sequence and for propagating the mesh from one frame to the next. Firstly, the perspective projection is inverted to lift all 2D feature matches to 3D world space using per view rendered depth maps. Since the tracking mesh has far less number of vertices compared to the dense matches, the present method uses barycentric coordinates with respect to the tracking mesh to represent the locations of the matches. In one embodiment, world space matches are represented as normal displacements. For each matched point pair $(u_i; u_j)$, the present method finds a base surface point $b_i \in S$ contained in triangle $\Delta(a, b, c)$ such that $b_i$ is the root of:

$$(u_i - b_i) \times n_i = 0,$$

where $$b_i = \alpha a + \beta b + \gamma c, \quad n_i = \frac{\alpha n_a + \beta n_b + \gamma n_c}{\|\alpha n_a + \beta n_b + \gamma n_c\|},$$

subject to $\alpha + \beta + \gamma = 1$ $$u_i = b_i + h_i \cdot n_i, \quad h_i \in R$$

$n_i$ is the interpolated normal vector at $b_i$.

The barycentric constraints $c_j$ on the target mesh are computed by making the interpolated normal and normal displacements equal in the source and target. By minimizing this specific algebraic distance instead of the geometric distance, a least squares solution is obtained.

$$c_j = u_j - h_i \cdot n_i$$

Working with localized displacements enables stable solutions for very sparse constraints. For example, assume two identical frames with perfectly matched face features. The expected solution is the identity. Using barycentric constraints without any displacement term would deform the mesh to bring the samples points closer to the reconstruction. This undesired behaviour results from the inherent piecewise linear approximation of the surface combined with sparse sampling. Using normal displacements at the match sites will produce the correct identity solution. The proposed algebraic distance retains this property of normal displacements. Normal displacements don't produce physically accurate mesh deformation for bending. Hence, linear interpolation of normals is not physically accurate and it's not obvious that minimizing the geometric distance would improve significantly the accuracy of the results.

To solve the vertex positions of the tracking mesh p, the present method uses Laplacian deformation minimizing the following energy:

$$E(p) = \|Lp - \delta\|^2 + \lambda \|MBp - Mc\|^2. \quad (1)$$

In one embodiment, the Laplacian matrix L is computed with cotangent weights normalized by the mixed Voronoi area. The barycentric equation matrix B is built using one row per world space match with only three non-zero entries for ($\alpha$, $\beta$, $\gamma$). The weight matrix M contains the per-match quality score. The present method uses a weight based on the reconstructed surface slope in the camera coordinate system to give more importance to surface elements parallel to the image plane.

It may be noted that while Laplacian deformations are fast and effective, they deal poorly with rotations if the Laplacian coordinates $\delta$ are not updated. The present method updates $\delta$ to remove the global rigid rotation with the world space matches ($u_i$, $u_j$). Remaining rotations caused by the neck are common between takes during a capture session, however. This causes unnatural deformations of the regions that have few image matches, which is a problem at the initial feature matching stage. Therefore, the present method identifies all vertices with insufficient constraints, and solves for their coordinates finding the as-rigid-as possible (ARAP) surface via non-linear optimization. In one embodiment, the present method selects the fixed vertices using order statistics based on the sum of the constraint weights per vertex. These vertices will keep the coordinates from the first Laplacian deformation solution, while the remaining will be extrapolated via ARAP mesh deformation. The mesh normals and Laplacian coordinates are then updated for the next iteration with the ARAP results.

One of ordinary skill in the art would appreciate that least-square fits are very sensitive to outliers. In one embodiment, the method of present specification uses the Least Trimmed Square estimator to fit robust triangles and remove a pre-determined percentage of matches as potential outliers. When matching meshes with fairly different pose, which in the present process occurs between the beginning of each sequence and the main neutral expression mesh, the dense matching is iterated and all the following steps using the result from the previous iteration are employed to reduce the search regions and start with more accurate Laplacian coordinates. The output of this process is a set of performance measurements, derived from captured performances, which can be used, in conjunction with templated blendshapes, stored in a database, to create optimized, personalized blendshapes.

Blendshape Personalization and Optimization

In the blendshape personalization and optimization process, a set of template blendshapes are personalized and optimized relative to facial expression measurements, taken from actor performances, to yield output blendshapes that are sufficiently close reproductions of the original facial expressions, as measured by an average fitting error, and/or adapted to be modified along four different dimensions, including sparseness, temporal smoothness, deformation, and direction. This process may be executed by iteratively executing solutions to the following optimization problem:

$$\min_{w_i, R_i, t_i, D, b_0} \sum_{i=1}^{n_f} E_g^i, \quad (2)$$

where $$E_g^i = \|M_i(x_i - p_i)\|^2,$$

$$x_i = (I_{n_v} \otimes R_i)(Dw_i + b_0) + (1_{n_v} \otimes t_i).$$

In the above equations, $x_i$ is the reconstructed face pose based on the blendshape model (pose offsets D, the neutral pose $b_0$, and blendshape weights $w_i$) and estimated rigid motion (rotation $R_i$ and translation $t_i$) at the $i^{th}$ frame, and $p_i$ is the input tracked facial performance.

$$M_i = \hat{M}_i \otimes I_3$$

where $\hat{M}$ is a square diagonal matrix where each diagonal element stores the matching confidence value of each vertex.

In the following description, it is assumed that the confidence matrix is pre-multiplied to the performance and the blendshape model. $I_{n_v}$ is an identity matrix with size of number of vertices $n_v$, and $1_{n_v}$ is column vector of ones with the length of $n_v$.

Based on Equation 2, an optimal solution is determined for all the variables with head rigid motion and blending weights at each frame, and the optimal blendshapes and neutral pose that can best explain the input performance. One of ordinary skill in the art would appreciate that the problem is impossible to solve directly. For example, even if the head rigid motion and neutral pose are set as constant, Equation 2 simply becomes a matrix factorization problem $$\min_{W, D} = \|\tilde{P} - DW\|^2 \quad (3)$$

which still has infinite number of solutions.

In one embodiment, to produce a preferred solution, the present method introduces additional regularizations. In one embodiment, the method of present specification gradually improves blendshape weights, head rigid motion, blendshape offsets, and the neutral pose by iterating over a plurality of steps, described below, until there is no significant improvement over all the variables.

Figure 3:
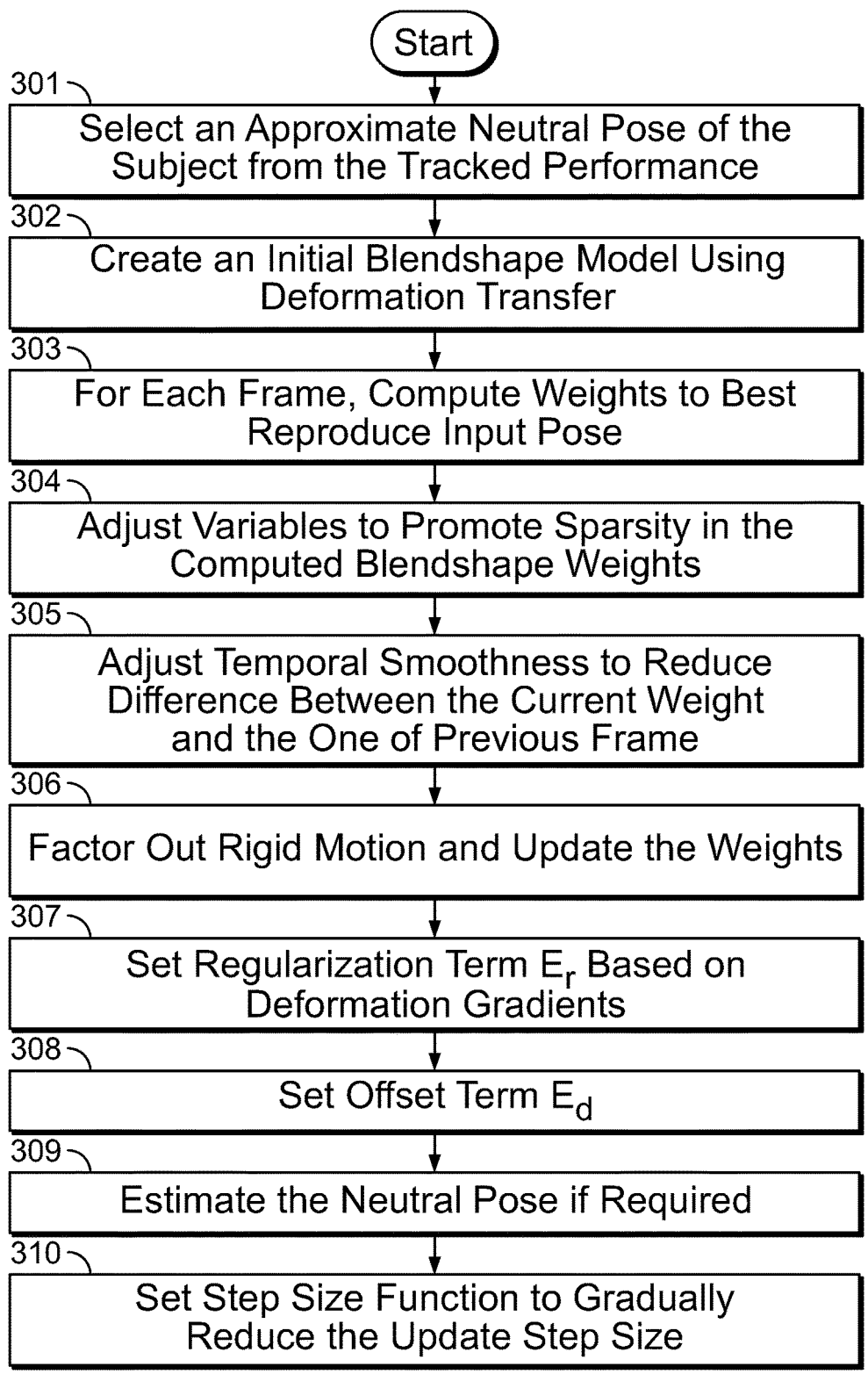
FIG. 3 is a flowchart illustrating the blendshape optimization process in accordance with one embodiment of the present specification.

The blendshape optimization process of the present specification is illustrated by means of a flowchart in FIG. 3. The following sections explain various steps of the process, with reference to FIG. 3.

Initial Blendshape State

Referring to FIG. 3, as a first step 301, an approximate neutral pose of the subject is manually selected from the tracked performance. It may be noted that the present method does not assume a "perfect" neutral pose, but rather optimizes for the pose as well. An initial blendshape model is created using deformation transfer, as shown in 302, which is known in the art. Each synthesized expression $b_i$ for the subject is generated by applying the deformation gradients from a source character pose to $b_0$ (initial pose). The result becomes a generic linear deformable model $D^*$ for the subject, where each column of $D^*$ equals to $b_i-b_0$. This model serves as an initial state upon which the optimization process is performed.

Updating the Initial Blendshape State with Weights and Rigid Motion

In the next step 303, for each frame, weights $w_i$ are computed, which adapt the requisite pose to the current blendshape model D, so as to best reproduce the input corresponded performance measurement P. It may be noted that initially $D=D^*$. This process step is cast as a simplified version of Equation 2 where D and $b_0$ are fixed:

$$\min_{w_i, R_i, t_i} E_g^i. \quad (4)$$

The weights $w_i$ are constrained between 0.0 and 1.0.

Equation 4 is a non-linear optimization problem due to the rotation variables. Nevertheless it is possible to use constrained nonlinear optimization techniques to solve it. The Jacobian matrix for Equation 4 should be very similar to the one from any linear deformable model. An alternative way to solve Equation 4 efficiently is to use a local/global method, which solves rigid transformation and other parameters separately. The optimal rigid transformation can be solved with singular value decomposition when $w_i$ is fixed. On the other hand, the weights can be solved with constrained quadratic programming when R and t are fixed.

Since the process used by the present method converges quickly and produces correct head motions, two regularization terms are introduced into Equation 4 to provide meaningful blendshape weights and to avoid over fitting:

$$\min_{w_i, R_i, t_i} E_g^i + \lambda_s E_s^i + \lambda_t E_t. \quad (5)$$

Sparseness

The method of present specification produces a posing computation that favours using as few blendshapes as possible to fit the input measurement. In one embodiment, the following energy is introduced to promote sparsity in the computed blendshape weights. One approach is sparser than another if it uses fewer blendshapes to achieve the input facial expression measurements. This energy variable is appropriately adjusted in step 304. The sparseness term is the square of the L1 norm:

$$E_s^i = \|w_i\|_1^2.$$

This is different from the traditional Lasso regularization, where $\|w\|_1$ is used. Taking advantage that the weight $w_i$ is non-negative, $\|w_i\|_1$ becomes $1_{n_b}^\tau w_i$.

Where $n_b$ denotes the number of poses. It may be noted that $n_b$ does not count for the neutral pose as it does not belong to D in the present formulation.

Minimizing $\|w_i\|_1$ is equivalent to minimizing $\|w_i\|_1^2 = \|1_{n_b}^\tau w_i\|^2$. Therefore, the L1 regularization problem is turned into a constrained least squares problem, which can be solved with any quadratic programming solver.

$\Lambda_s$ is set to be 0:1 in all the examples.

Temporal Smoothness

One of ordinary skill in the art would appreciate that if the input performance is captured contiguously, the blendshape weights from the previous frame can serve as a strong prior solution as we solve for the next frame. The temporal smoothness term penalizes differences between the current weight and the one of previous frame:

$$E_t^i = \|w_i - w_{i-1}\|^2.$$

The temporal smoothness is appropriately adjusted in step 305.

Updates

It should be appreciated that Equation 5 has to be solved sequentially since there is rigid motion estimation in the inner loop at each frame. However, if the head rigid motion is not part of the variables, such as in the very last iterations where the rigid motion is fairly stable, the rigid motion can be factored out and the weights can be updated all together in a space-time fashion. This step is shown as 306. Assuming ~P is the collection of performance that has the head rigid motion and neutral pose removed, the following optimization is obtained:

$$\min_W E_{\tilde{g}} + \lambda_s E_s + \lambda_t E_t, \quad (6)$$

$$E_{\tilde{g}} = \|(I_{n_f} \otimes D) vec(W) - vec(\tilde{P})\|^2, \quad (7)$$

$$E_s = \|(I_{n_f} \otimes 1_{n_b}) vec(W)\|^2$$

$$E_t = \|(A \otimes I_{n_b}) vec(W)\|^2.$$

A is the backward difference operator, and vec is an operator that stacks the columns of the input matrix into a vector. The $E_{\tilde{g}}$ term is identical to the energy term described in Equation 3.

In one embodiment, the blendshapes and weights are alternatively optimized in an expectation-maximization (EM) fashion. In this step, the weights and the rigid transformation are fixed. To solve for a new set of blendshapes D, the optimization then becomes:

$$\min_D E_{\tilde{g}}, \quad (8)$$

$$E_{\tilde{g}} = \|(W^T \otimes I_{n_b}) vec(D) - vec(\tilde{P})\|^2. \quad (9)$$

The blendshape weights can be viewed as the relative contribution of each shape to the reconstructed pose; therefore they also specify how the residuals should be redistributed back to the blendshapes. Equation 9 is equivalent to Equation 7 except the variables are rearranged.

Deformation Regularization

To ensure that the personalized blendshapes retain the semantics of the template shapes, the present method introduces a regularization term $E_r$ based on deformation gradients:

$$\min_D E_{\tilde{g}} + \lambda_r E_r + \lambda_d E_d, \quad (10)$$

-continued $$E_r = \|G'vec(D) + G'(1_{n_b}^T \otimes b_0) - g^*\|^2,$$
$$E_d = \|vec(D) - vec(D^*)\|^2.$$

D* is the initial blendshape model;

$$G' = I_{n_b} \otimes (G \otimes I_3)$$

where G is the deformation gradient operator matrix;
g* is the stacked vector of all deformation gradients from the initial blendshapes.

The term $E_r$ is set to an appropriate value, as shown in step 307. The term $E_r$ constrains the blendshapes to have similar deformation with respect to the initial blendshapes. However, only using deformation gradient regularization does not provide desirable results, as regularization in the differential space does not consider the direction of motion in each blendshape, which is one of the important ingredients of the shape semantic. Therefore, in one embodiment, another regularization term $E_d$ is added as shown in step 308, which indicates the offset D should be similar to D*. In other words the offsets should have similar directions. This additional term greatly helps the stability of the optimization. In one embodiment, the localized property of D* is that if a vertex is static in a particular template shape, the same vertex in the personalized shape remains static.

In one embodiment, $D_{ki}=0$ is enforced as a boundary condition if $D^*_{ki}=0$, where the subscript indicates row and column indices. By optimizing in this way, the region that each new shape is allowed to vary is limited and the deformation semantics of each expression are well maintained. This step is crucial because it obviates the necessity of shape cleaning or shape isolation. The scalars $\lambda_r$ and $\lambda_d$ control how deformable the result shapes can be. In a preferred embodiment, $\lambda_r=0.1$ and $\lambda_d=0.05$.

Neutral Pose Estimation

As noted from the above discussion, so far the present optimization process only considers improving the blendshapes in terms of offsets, while the neutral pose is considered as constant through the process. In one embodiment, if the estimation of the neutral pose also is desired, W, D*, and g* are replaced by:

$$\hat{W} = \begin{pmatrix} 1_{n_f} \\ W \end{pmatrix}, \hat{D}^* = (0_{(3n_v)} \mid D^*), \hat{g}^* = \begin{pmatrix} 1_{n_t} \otimes I_3 \\ g^* \end{pmatrix}.$$

$1_{n_t} \otimes I_3$ $1_{n_t} \otimes I_3$ is introduced as the deformation gradients of the neutral pose (no transformations at all), where $n_t$ is the number of triangles. The first column of the solved D is the update for the neutral pose. It may be noted that neutral pose estimation is very useful in accommodating consistent fitting residual throughout the performance. Any consistent residual due to the neutral pose difference is absorbed by the neutral pose and not split into other blendshapes. Estimation of neutral pose is illustrated in step 309.

Optimization Strategy

One of ordinary skill in the art would appreciate that after the initial steep gains, this process often leads to very slow convergence and can be viewed as a coordinate descent approach. For a descent-based approach, it may be helpful to modify the learning rate over time. Therefore in one embodiment, the method of present specification introduces a step size function, as shown in step 310, to gradually reduce the update step size when the objective function is not evidently improving:

$$\alpha = \eta \tanh(\beta(E_{\hat{g}(k-1)} - E_{\hat{g}(k)})),$$

$$D_{(k)} = \alpha_d D'_{(k)} + (1-\alpha_d) D_{(k-1)},$$

$$b_{0(k)} = \alpha_n b'_{0(k)} + (1-\alpha_n) b_{0(k-1)} \quad (11)$$

$\alpha$ acts as the step size to advance from the previous solution to the next;
$\eta \in [0, 1]$ is the learning rate;
$\beta$ is a decay factor; and tan h is the sigmoid function that serves as a brake for the optimization process. Other sigmoid functions can be employed as well.

If $(E_{\hat{g}(k-1)} - E_{\hat{g}(k)})$ is large, then $\alpha \approx \eta$, otherwise $\alpha$ approaches zero if the improvement of the objective energy is small (in other words no more update). In one embodiment, the optimization is stopped if the improvement is less than $1e^{-6}$.

$D'_{(k)}$ is the solution directly from Equation 10 at the $k^{th}$ iteration. It is further damped by the solution from the previous iteration to create the current one. In one embodiment, $\beta$ is 10.0, $\eta_d$ is 0.75 and $\eta_n$ is 0.25 if the input neutral pose is from the performance measurement. For the case of directly fitting a generic template character, $\eta_n$ may be increased to 0.75 to allow more deformation.

It may be understood by a person of ordinary skill in the art that the method of present specification automates a subjective process, wherein an output pose (blendshape) mirrors the actor's performance as accurately as possible and also looks good from an artistic point of view. To assist in the creation of desirable output blendshapes, in one embodiment, the present system provides a display-based control and enables the artist to fine tune the final output. This allows an artist to realize his or her artistic vision without having to manually modify the output.

Figure 4:
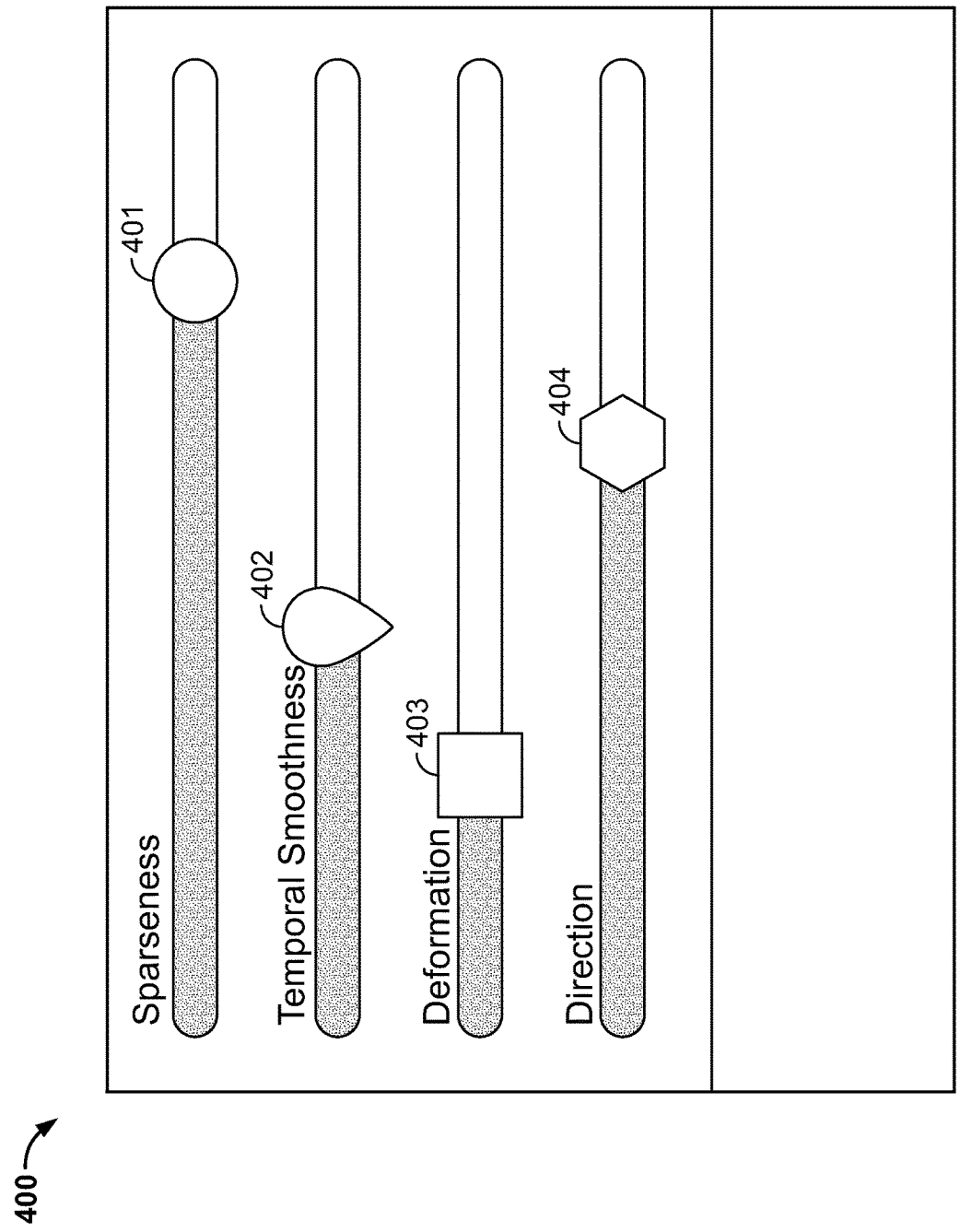
FIG. 4 illustrates an exemplary GUI screen that is presented to an artist for manipulating an output blendshape in accordance with an embodiment of the present specification.

In one embodiment, the present system provides a user interface (GUI) that allows an artist to fine tune the final output image. FIG. 4 illustrates an exemplary GUI screen 400 that is presented to an artist on a display for manipulating the output blendshape. Referring to FIG. 4, GUI 400 comprises at least four sliders 401, 402, 403 and 404. Each of the sliders, when manipulated, change the variables associated with one of the key operations in the process of blendshape personalization, as described with reference to FIG. 3 above.

Referring to FIG. 3 and FIG. 4, in one embodiment, all sliders correspond to an energy variable, such as $E_s$, $E_t$, $E_r$, and $E_d$, defined by various equations in the description above. In one embodiment, the first slider 401 corresponds to sparseness coefficient $E_s$. As defined above, increased sparseness in computed blendshape weights implies that there is less room for the initial template to deform and fewer features are available. Thus, it takes into account fewer poses to optimize the initial template. This may make sense when a desired pose is well represented by a small number of input poses. Lower sparseness implies that there is more room for the initial template to deform, and the artist can refine with more poses. This makes sense when a more complex pose is desired that requires multiple input poses. By moving the slider 401 forward or backward, an artist can increase or decrease the degree of sparseness, as required by the output pose.

In one embodiment, the second slider 402 corresponds to temporal smoothness $E_t$. As described above, temporal smoothness is the amount of smoothness between frames, and this term penalizes differences between the weights of the current frame and those of previous frames. This temporal smoothness coefficient is not very useful when capturing individual poses, but when capturing a continuous performance, temporal smoothness can be modified so that adjacent frames having similar expressions appear smooth and there is no jarring between frames. By moving the slider 402 forward or backward, an artist can increase or decrease the degree of temporal smoothness, as required by the output frame. In one embodiment, the slider can be moved to one direction (the left) to eliminate temporal smoothness altogether where performance measurements from only a single frame are being considered.

In one embodiment, the third slider 403 corresponds to deformation regularization $E_r$. As described above, deformation regularization is based on deformation gradients and constrains the blendshapes to have similar deformation with respect to the initial blendshapes. This enables the personalized blendshapes retain the semantics of the template shapes. Thus, in one embodiment, an artist can adjust the degree of deformation regularization by moving the slider 403, and ensure the continuity of the basic face blendshape between poses.

To obtain desirable results, the direction of motion in each blendshape is also to be considered, as it is one of the important ingredients of the shape semantic. This tuning is achieved by adjusting another regularization term $E_d$, which indicates that the offsets of adjacent blendshapes should have similar directions. This additional term greatly helps the stability of the optimization and can be adjusted, in one embodiment, by moving the slider 404.

One of ordinary skill in the art would appreciate that the GUI may be adapted to include any number of user controls to fine tune and manipulate the blendshape, depending on the application and purpose.

In one embodiment, the blendshape optimization process is implemented in Python, such that it can directly be imported into Autodesk's Maya and benefit digital modelers. In one embodiment, the QP solver in CVXOPT and the sparse linear solver based on LU decomposition in SciPy are used to solve Equation 5 and 10, respectively.

Figure 5:
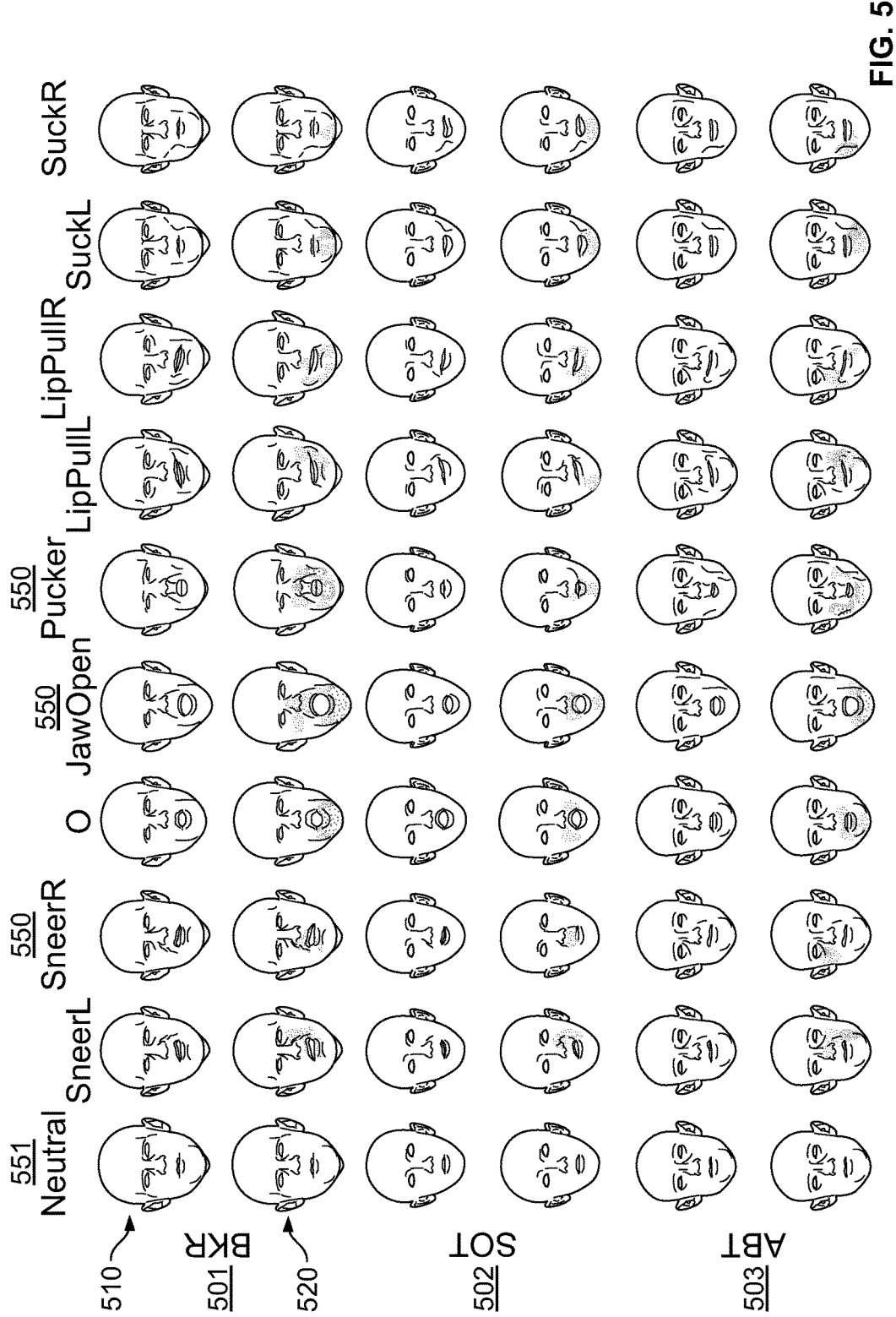
FIG. 5 illustrates exemplary optimized blendshapes from three subjects, after going through the process of present specification, in accordance with one embodiment.

FIG. 5 illustrates exemplary optimized blendshapes from three subjects, after going through the process of present specification. Referring to FIG. 5, template blendshapes for three subjects BKR 501, SOT 502, and ABT 503 are produced. The template blendshapes represent various poses 550 of the subjects, such as—Sneer, jawOpen, Pucker, Suck, among others, in addition to a neutral pose 551. The top row 510 for each subject shows the initial blendshapes corresponding to various poses, while the bottom row 520 for each subject shows the refined blendshapes corresponding to the same poses. The color in a blendshape indicates the magnitude of the change.

As described in the process above, the initial blendshapes are bootstrapped by using a template character. In one embodiment, the template character consists of 35 poses, not including the neutral pose.

Figure 6:
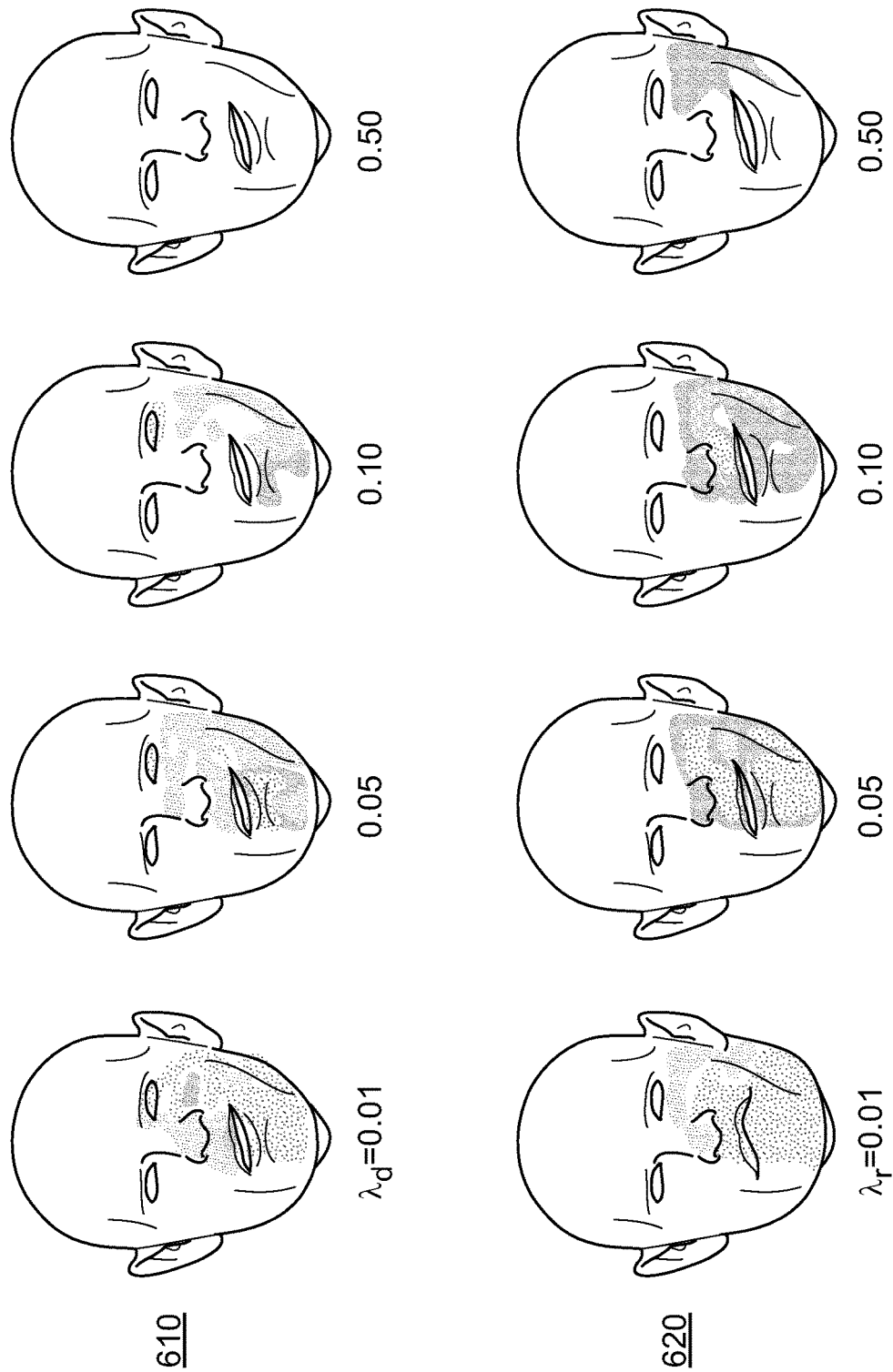
FIG. 6 illustrates the influence of regularization parameters $\lambda_d$ and $\lambda_r$, in accordance with an embodiment of the present specification.

FIG. 6 illustrates the influence of regularization parameters $\lambda_d$ and $\lambda_r$, as discussed above, which determine the energy variables $E_d$ and $E_r$. As described above with reference to FIG. 4, $E_d$ and $E_r$ can be controlled by the artist to fine tune the final blendshape. Referring to FIG. 6, the influence of deformation regularization $\lambda_d$ is shown in 610. The influence of direction offset regularization $\lambda_r$ is shown in 620. In both cases, the cross hatching indicates shape differences between the original blendshape and the refined ones. As is apparent from the Figures, an increase in $\lambda_r(E_r)$ yields smoother results; however it suffers from large distortion due to its differential formulation. On the other hand, an increase in $\lambda_d(E_d)$ results in better matching with the original shape; however, it produces more irregularities. Thus, an artist is required to achieve a balance between the two, which is facilitated by the GUI of the present system.

It may be noted that the present technique is capable of learning poses directly using a template character. For neutral pose estimation in cases where the neutral pose of the input template character is significantly different from the captured subject, $\eta_n$ is increased to 0.75 such that it gives the neutral pose more flexibility to deform.

Figure 7:
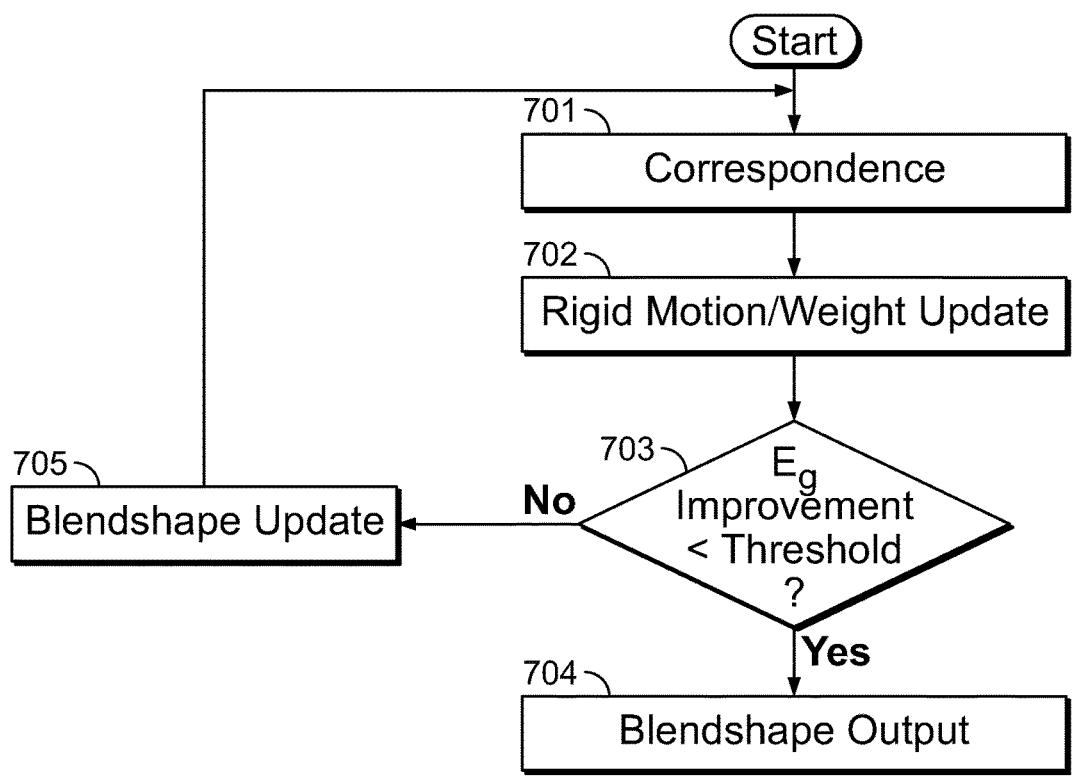
FIG. 7 is a flowchart illustrating the method of tracking via non-rigid registration, according to one embodiment of the present specification.

It may also be noted that prior art facial correspondence processes only accurately track within a short timeframe. In contrast, the present method is capable of processing long sequences of dense geometry reconstruction. For this purpose, the present method employs a tracking technique based on non-rigid registration. As the dense geometry reconstruction is not corresponded with the blendshape model, an extra step to establish correspondence is preferred. FIG. 7 is a flowchart illustrating the method of tracking via non-rigid registration, according to one embodiment of the present specification.

Referring to FIG. 7, the first step 701 is correspondence. In this step, for each vertex of the estimate shape, which is produced by using the current blendshapes, the present method searches the k nearest neighbors (k=3 in the present example) on the input geometry reconstruction. Weight is given to their influences based on the dot products between their normals and the normal from the current vertex. The corresponded point is defined as:

$$p_c = \sum_{i=1}^{k} w_i d_i + x$$

Where $d_i$ is the point-to-plane distance;
$w_i$ is the influence of the samples; and
n and x are the vertex normal and position (from the blendshape model).

The next step 702 is updating rigid motion and/or weight. In this step, based on the current estimation of correspondences, the rigid motion and blendshape weights are solved by using Equation 5. Steps 701 and 702 are repeated, and blendshapes are updated in step 705, until the improvement of $E_g$ is less than a threshold, as shown in 703. In one embodiment, the fitting residuals from the last iteration are saved for the shape update. These two steps 701, 702 together can be regarded as a non-rigid iterative closet points (ICP) algorithm that is based on a blendshape model.

The next step 704 is blendshape output. Once all the input frames are processed according to the previous steps, Equation 10 is solved to obtain new estimate of blendshapes.

Figure 8:
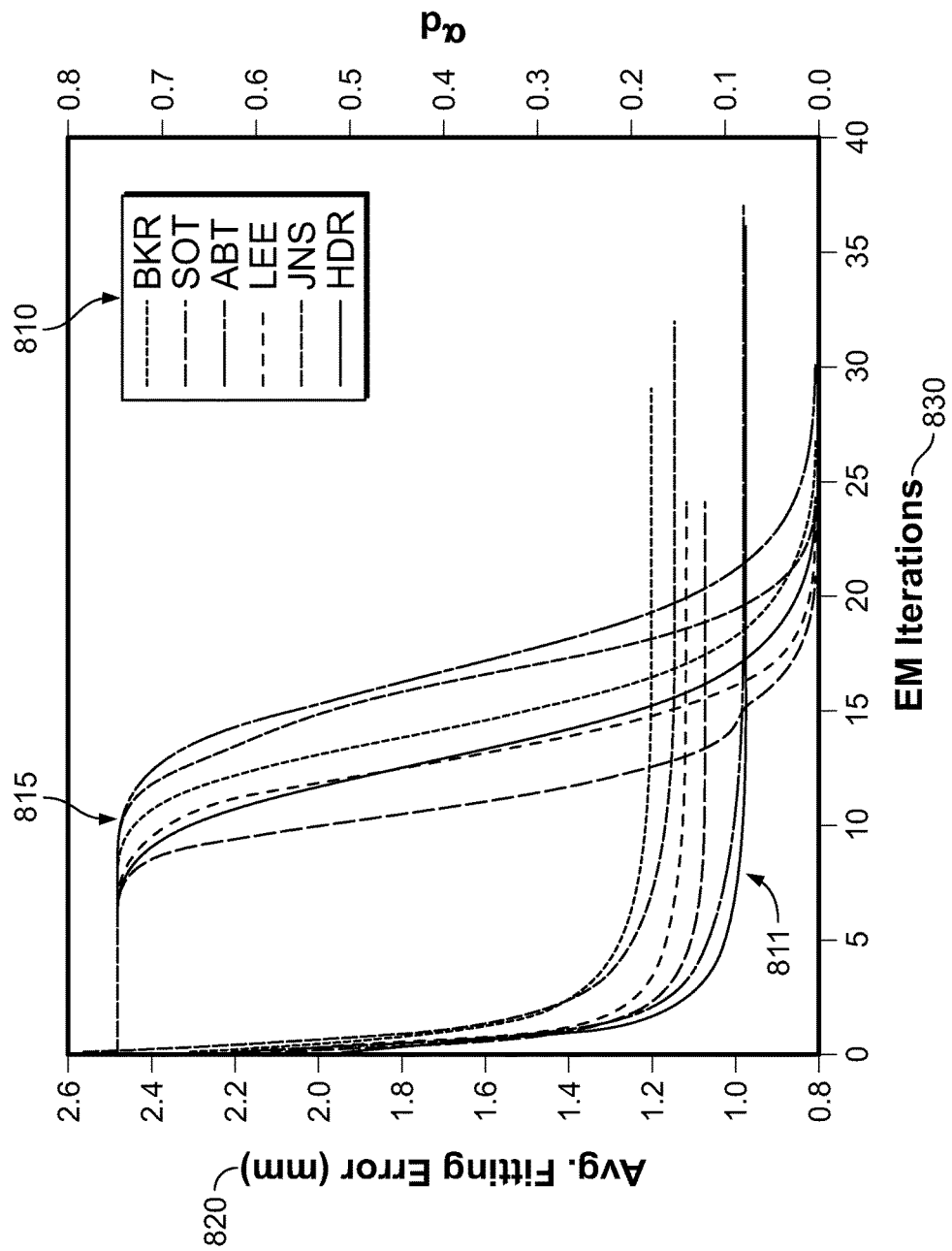
FIG. 8 illustrates averaged fitting errors and convergence behavior, when the present method is applied to templates of various subjects, according to one embodiment of the present specification.

FIG. 8 illustrates averaged fitting errors and convergence behavior, when the present method is applied to templates of various subjects 810. As can be seen from the graphs 811, the average fitting error (in mm) 820 decreases, as iterations 830 of the present method increase. The averaged fitting error (root-mean-square error) is derived as:

$$\sqrt{\frac{E_g}{n_v n_f}}.$$

The figure also shows the graphs 815 for step size function a, which is defined and described above with reference to FIG. 3. The step size function indicates when the optimization begins to slow down and stop. As mentioned, a approaches zero if the improvement of the objective energy is small. In one embodiment, the optimization is stopped if the improvement is less than $1e^{-6}$.

In one embodiment, linear blendshapes are replaced with a deformation gradient blending mechanism for shape fitting, to further increase the accuracy of modeling facial movements.

In one embodiment, in addition to blendshapes, the present approach is extended to bone-based rigs, and is used to optimize bone positions and skinning weights.

It may be noted that prior art techniques do not employ quantitative analyses and do not focus on convergence when updating the blendshape weights and shapes themselves. The present specification provides a robust method to converge to the nearest local minimum, thus prevent the solution from drifting. In terms of using deformation gradients as regularization, the present approach is more close to "non-rigid fitting based on performance capture data", since the number of blendshapes is usually less than the training sequence, as opposed to "deformation transfer with sparse input samples". For example, it makes less sense to have a data fitting term in differential space for a (same subject) performance capture setting. Head rigid motion is not estimated in prior art methods as these approaches are not designed for performance capture.

Further, the present approach utilizes two tracking methods: the first one is a neutral-to-pose tracking that is based on a multi-feature no rigid tracking; and the second method is based on non-rigid registration that helps to process longer sequences. None of these tracking methods use the concept of anchor frames as used in prior art. Thus, the present method provides a unique solution to an important problem encountered by facial animators, which has not been fully addressed before.

Blendshape Animation

With a set of optimized blendshapes generated, the blendshapes then need to be animated, based on an actor's performance. Specifically, the blendshape animation process of the present specification receives, as an input, the blendshapes generated by the process described above and a plurality of video frames, preferably generated by at least two different video input views in combination with camera calibration information.

From the plurality of video views and camera calibration information, which describes the relative positions of the cameras, the system generates a three dimensional dense stereo reconstruction using approaches known to persons of ordinary skill in the art. It may be noted that prior art approaches to simply combining a set of blendshapes and a set of 3d dense stereo reconstructions on a frame by frame basis yield fairly noisy results. Therefore, in one embodiment, the present specification describes a process to obtain a high quality blendshape animation and minimize the noise.

Figure 10:
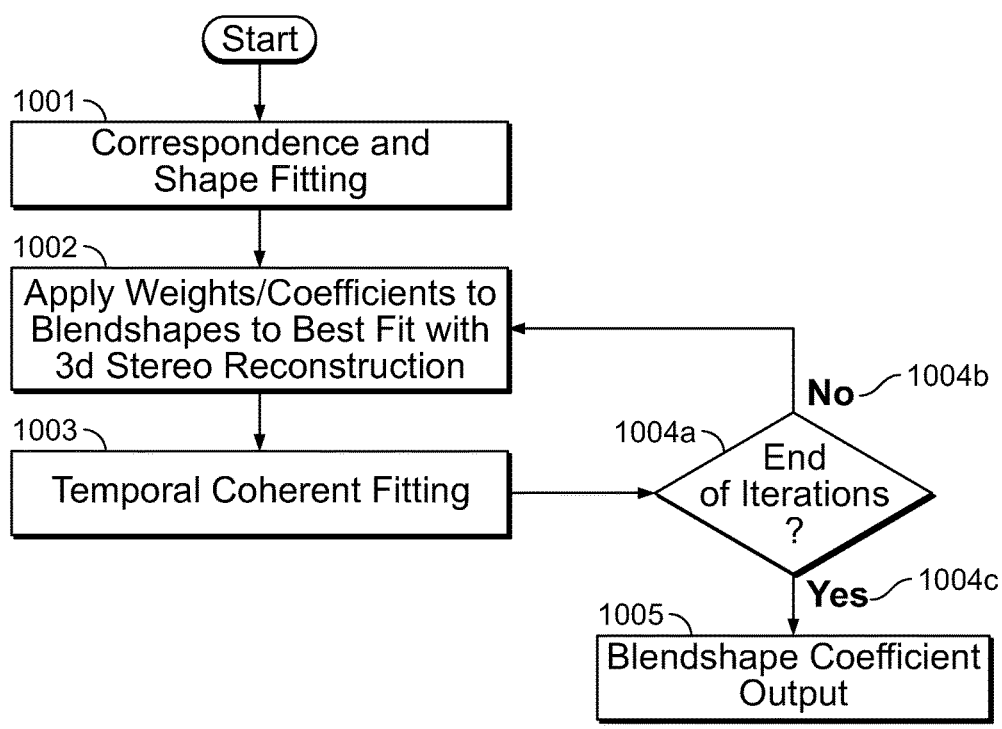
FIG. 10 is a flowchart illustrating the blendshape solver algorithm, according to one embodiment of the present specification.

FIG. 10 is a flowchart illustrating the blendshape animation process, according to one embodiment of the present specification. Referring to FIG. 10, in the first step 1001, the system engages in a correspondence process. That is, for each vertex in each blendshape in each frame, the system finds a corresponding point between the vertex and a point on the 3d dense stereo reconstruction. It may be noted that each blendshape has a fixed vertex topology, according to one embodiment. Preferably all blendshapes have the same number of vertices and the same connectivity between those vertices, creating standardization across all blendshapes. In one embodiment, the number of vertices is in the range of at least 1,000.

Starting from an initial guess of the coefficients of the applicable blendshapes for a given frame, which can be a neutral shape (a coefficient of 1 for neutral and 0 for other shapes) or imported from prior calculations, the present animation process computes output blendshape coefficients by engaging in a first correspondence process 1001 and an iterative coefficient update process 1002, 1003, 1004*a-c*. In the correspondence step 1001, a blendshape is associated with the 3d dense stereo reconstruction, also referred to as a 3d mesh, by interpolating input blendshapes linearly and the closest point on the input mesh for each vertex in the interpolated blendshape. In the iterative coefficient update process 1002, 1003, 1004*a-c*, the coefficients are optimized by minimizing the sum of squared distance between the blendshape vertices and the closest points on the input mesh while minimizing the amount of jitter or discontinuities between frames. Once the iterations converge on a set of coefficients, the process stops and a plurality of optimized coefficients or weights for a plurality of blendshapes in each frame is generated as the output 1005.

More specifically, the correspondence process may be performed by any known mapping technique which determines the most appropriate association between a given vertex and a corresponding point on the three dimensional mesh. One of ordinary skill in the art would know how to linearly interpolate input blendshapes with the closest points on the three dimensional mesh.

After mapping the vertices, the system searches for coefficients that best blend the blendshapes to achieve a good fit with the 3d stereo reconstruction, on a frame by frame basis. This is shown in 1002, and is achieved by applying fitting algorithms that result in an optimized weight or coefficient assigned to each blendshape in each frame. A mentioned above, there are multiple blendshapes, each with a vertex topology, with each blendshape having a weight. Therefore, to achieve a specific facial expression, such as a unique smile for example, relative to the 3d dense stereo reconstruction, a weight of $X_1$ may be assigned to the broad smile blendshape, a weight of $X_2$ may be assigned to the open mouth blendshape, a weight of $X_3$ may be assigned to the grin blendshape, and so on. In one embodiment, the various weights preferably are constrained such that they add up to a fixed number, such as 1. After computing the blendshape coefficients for a certain frame, the corresponding output blendshape can be obtained directly by linearly blending input blendshapes based on the coefficients. This output blendshape is considered to be the optimal fit to the input 3D mesh. The per-vertex fitting error can be further visualized by encoding a color to each vertex according to the distance from each vertex to its closest point on the input mesh.

After the optimized mixing or weighting of blendshapes, relative to the 3D dense reconstruction, for each frame, 1002, the smoothness between frames is optimized. All the frames in a sequence are independent to each other and thus can be computed in parallel. However, due to the significant amount of noise in the input 3D mesh, the fitted blendshape animation from the above described process is very likely to be optimized for a given frame, but not be optimized between frames, thereby creating a discontinuity or jitter between frames. Accordingly, the presently disclosed process applies an additional temporal smoothing process such that for each frame, the output blendshape coefficients are optimally smoothed not just within a given frame but between frames as well, thereby minimizing changes between frames.

In one embodiment, the present specification provides an order-independent blendshape fitting algorithm which supports parallel computation and general temporally coherent output animation. To achieve this, the blendshape coefficients are computed 1003 for an entire sequence of frames in multiple passes. In the first pass, each frame is computed independently. At the end of each pass, temporal smoothing is applied to the coefficient curve for each blendshape. The filtered coefficients will be temporally coherent but may be too smooth. In one embodiment, the filtered coefficients are used as temporal constraints for the next pass. In the next pass, each frame still can be computed independently in parallel, because the temporal constraints for each frame are the filtered coefficients which come from the results in the last pass.

Accordingly, the weights of the blendshapes are smoothed relative to the weights of the blendshapes in the frames around them. For example, the weights of the blendshapes in frame 3 are smoothed relative to the weights of the blendshapes in frames 2 and 4, and so on. Any smoothing or interpolation algorithm suited for the purpose may be used may be used. The result is a new set of weights of the blendshapes in each frame.

Preferably, the optimization process of steps 1002 and 1003 are repeated, 1004*a-c*, until the weights stabilize. The purpose is to keep iterating in order to find the right balance between an accurate fit (1002) and minimal jarring or jitter between frames (1003). In one embodiment, the steps are repeated for less than 20 iterations. Typically, the optimized output is obtained after only 2 iterations. The output of the above process 1005 is a set of optimized weights for all the blendshapes in each frame, thereby resulting in an animated blendshape when rendered.

Applying Feature Constraints

One of ordinary skill in the art would appreciate that iterative blendshape fitting to a dense but noisy mesh may suffer from slow convergence and/or local minimum. Furthermore, it is often difficult to distinguish from the input 3D mesh certain important facial features, such as whether the eyes are open or closed, or how much they are open. To address these issues, in one embodiment, the present blendshape animation process can optionally use a plurality of feature constraints defining the three dimensional positions of several facial feature points, such as the contour lines of the mouth, eyes and eyebrows, which can be obtained via the facial marker tracking method and system, as described below. Each feature point provides a constraint for the three dimensional position of a certain point in the blendshape, which can be either a vertex or a point based on barycentric coordinates. Unlike the positional constraints from the dense mesh, the pair-wise correspondence between these feature constraints and the points in the blendshape is fixed and is loaded, in one embodiment, from a user provided file.

Accordingly, in one embodiment, the blendshape animation process includes a separate, independent step of first tracking the three dimensional positions of a sparse set of facial markers on an actor's face, based on captured video footages of the actor's facial performance. These markers are manually painted on the talent's face and their three dimensional positions can be used as feature constraints to improve the stability and accuracy of the blendshape animation results.

Figure 9:
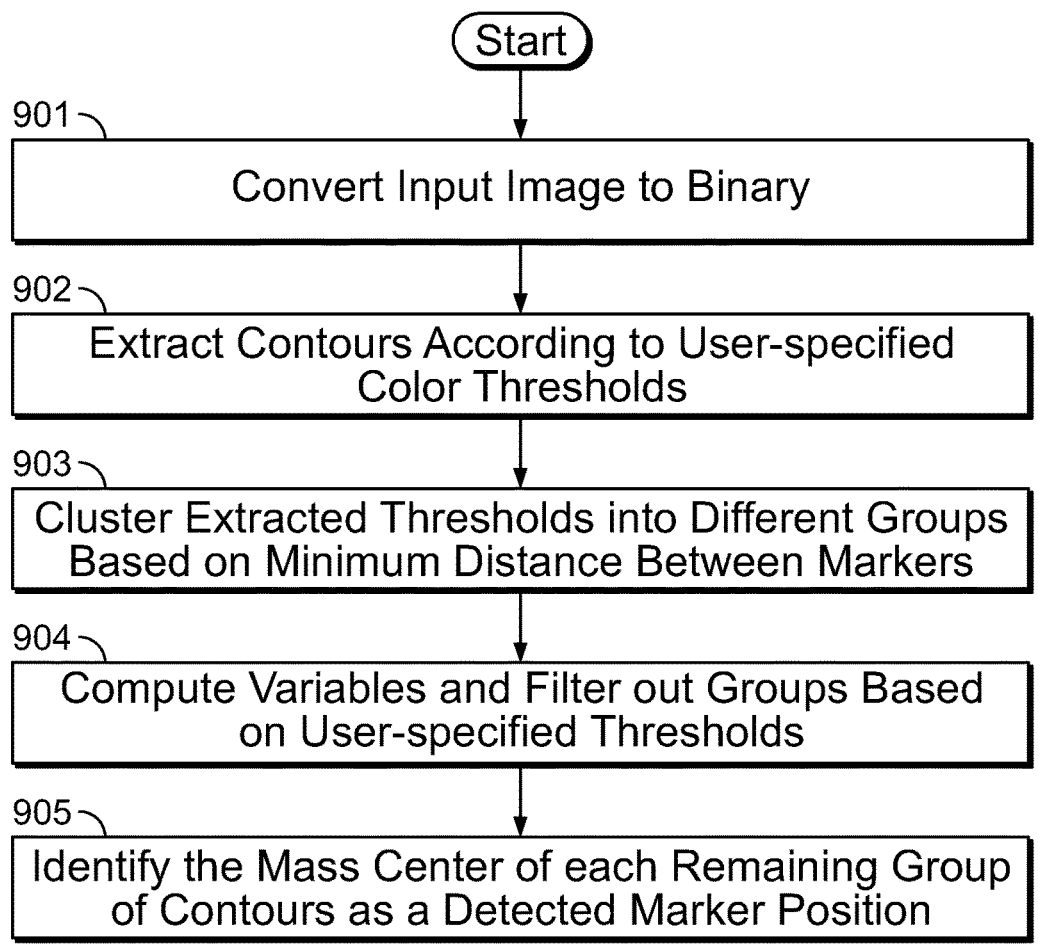
FIG. 9 is a flowchart illustrating a basic marker detection process, according to one embodiment of the present specification.

More specifically, in one embodiment, the present system uses a 2D marker detection process as a base for 3D marker tracking. FIG. 9 is a flowchart illustrating this process. Referring to FIG. 9, in the first step 901, an input image is converted to binary. Thereafter contours are extracted according to some user-specified color thresholds, as shown in 902. This step may be repeated several times. Then in step 903, the extracted contours are clustered into different groups based on a user-specified minimum distance between markers. Next in 904, the process computes predefined statistics for each group of contours, and optionally filters out some groups based on user-specified minimum or maximum thresholds for size, circularity, inertia and/or convexity. Finally in 905, the mass center of each remaining group of contours is identified as a detected marker position. It may be noted that the output of this marker detection step is a set of unordered marker positions, which may and may not correspond to real markers on the actor's face. Also some real markers may not be detected, either due to occlusions or inappropriate parameter setting.

In one embodiment, the complete set of parameters for marker detection is specified in an xml file. Among those parameters, one of the most important ones is the color of the markers, which is set to 255 for white markers and 0 for dark markers. Another two important parameters are the minimum and maximum sizes of the markers in units of number of pixels. Since the markers are manually painted onto the actor's face and may change their appearance significantly during the performance, it is desirable to set a relatively large range for circularity, inertia and convexity.

In one embodiment, the marker tracking tool of the present specification can start tracking markers from any frame in the sequence, and can move either forward to the next frame or backward to the previous frame. The 2D marker tracking tool operates using a closest point search approach. The status of a facial marker is distinguished as DETECTED, TRACKED, MISSED, VALIDATED, or INVALIDATED. Starting from a manually labeled frame or a previously tracked frame $f_{old}$, when processing a new frame $f_{new}$, the system first detects all the candidate marker positions in $f_{new}$ using the "Marker Detection" component mentioned above and sets the status of those markers as DETECTED. Then for each TRACKED or MISSED marker, the tool looks for the closest detected marker in $f_{new}$. If the closest marker is within a distance of a user-specified threshold, it is considered the closest marker as the corresponding marker in $f_{new}$ and its status is updated as TRACKED. If the closest marker is beyond the distance threshold, the status is set as MISSED.

It is important to prevent multiple markers from $f_{old}$ being tracked to the same marker in $f_{new}$. This is likely to happen for markers around eye contours when the character closes its eyes. To achieve this, in one embodiment, the indices of all the tracked markers are kept as a standard vector and checked whether this vector contains duplicated indices. If there are duplicated indices, the status of all the tracked markers in $f_{old}$ is checked, and the status of MISSED markers in $f_{old}$ is kept as MISSED for $f_{new}$.

Sometimes certain markers may become invisible or too small to be detected, but still may be tracked to nearby detected false markers. In one embodiment, these markers can be invalidated using a marker tracking GUI. The GUI and command line provide the option to overwrite the status of a certain marker to be INVALIDATED for all the frames. Just as MISSED markers, the INVALIDATED markers are not considered when computing the 3D marker positions during the later stage of the pipeline.

It may be noted that the most important user-specified parameter for the marker tracking is the distance threshold.

This threshold determines the search range when tracking markers across frames and is essentially the maximum distance a marker can travel between adjacent two frames. In one embodiment, the default value of this distance threshold is set to be a maximum of 100 pixels, preferably less than 100 pixels, and more preferably 30 pixels. It may be noted that too small a distance threshold may result in too many missed markers when the markers move very fast, while too large a value may lead to markers being tracked to false marker positions incorrectly. Since it is very likely that different markers move at different speeds, it is usually helpful to use different distance thresholds to track different makers. To achieve this, in one embodiment, the marker tracking tool provides the option to load a per-marker distance threshold scaling factor.

The computation of the 3D marker positions is based on applying three dimensional projections. Specifically, from each view, the tracked 2D markers are projected onto the 3D mesh to obtain the corresponding 3D positions, based on the 2D positions in the current view and the camera projection information. In one embodiment, for each marker to track, its projected 3D positions are averaged from all the valid views to get the final 3D marker position. It may be noted that MISSED or INVALIDATED markers are not considered for this purpose. In all the views, the 3D position of such markers is set to be the original point, so that the blendshape animation process in a later stage of the pipeline can identify and ignore those non-tracked 3D markers. One of ordinary skill in the art would appreciate that using 3D projection has an additional advantage that the markers only need to be tracked in at least one view.

In one embodiment, the 2D/3D marker tracking tool is equipped with a GUI, which allows a user to load either a single frame or a list of multiple frames as input, and contains several graphical icons to tweak the parameters for marker detection. In one embodiment, the GUI also provides the buttons/hotkeys to invalidate/validate selected markers, switch the status of two selected markers, and merge two selected markers.

As explained above, when 3D marker positions are used as feature constraints to solve the blendshape animation, the 3D marker positions are first computed from tracked 2D marker positions of each input view. In one embodiment, the present blendshape animation process does not compute or use any 3D marker positions. Instead, the 2D markers positions are used directly as feature constraints to solve the blendshape animation. Specifically, given the camera projection information of each view, the 2D marker positions of each input view provide spatial constraints on where certain points on the blendshape should be projected on the 2D plane.

Eliminating Rigid Motion

One of ordinary skill in the art would appreciate that an actor's head movement, particularly relative to a head cam, can introduce rigid motion and cause the fitting result to be less accurate. This is because the transformed shape space of the blendshapes is no longer well aligned with the reconstructed 3D meshes. To address these issues, in one embodiment, the present blendshape animation process can optionally minimize rigid motion effects by applying a rigid transformation to transform the blendshapes into the same world coordinate system as the 3D meshes. This rigid transformation can be computed, in one embodiment, by iteratively solving the transformation via ICP and the blendshape coefficients via the method described above for any single frame in the sequence. This is particularly important where the actor's head moves relative to the head cam, causing differences on a frame-by-frame basis. In that case, the rigid transformation is applied on a frame-by-frame basis. Therefore, in one embodiment, when an actor's head moves relative to a given point more than a predefined amount for a given set of frames, a rigid transformation process is applied on a frame-by-frame basis over those set of frames. If, however, an actor's head moves relative to a given point less than a predefined amount for a given set of frames, a rigid transformation process is applied once, thereby establishing a common coordinate system, for the entire set of frames.

In one embodiment, the present system follows another approach to eliminate the rigid head motion. Given the camera projection information and the tracked 2D markers positions, the present blendshape animation process computes an optimal rigid transformation to transform the blendshape such that the corresponding 3D points on the transformed blendshape best match the 2D markers under the camera projection. In the description and claims of the application, each of the words "comprise" "include" and "have", and forms thereof, are not necessarily limited to members in a list with which the words may be associated.

The above examples are merely illustrative of the many applications of the system and method of present specification. Although only a few embodiments of the present specification have been described herein, it should be understood that the present specification might be embodied in many other specific forms without departing from the spirit or scope of the specification. Therefore, the present examples and embodiments are to be considered as illustrative and not restrictive, and the specification may be modified within the scope of the appended claims.

We claim:

1. A computer-implemented method for animating a plurality of blendshapes within a graphical user interface rendered in a display, said method being implemented in a computer having a processor with a minimum clock speed of 2.6 GHz and a minimum random access memory of 2 gigabytes wherein said processor is in data communication with the display and with a storage unit, the method comprising:

acquiring from the storage unit the plurality of blendshapes, wherein each one of said plurality of blendshapes is defined by data representative of a plurality of vertices and relationships between said vertices that, when rendered onto said display, visually represent at least one facial expression;

acquiring a plurality of frames from at least two cameras and a plurality of calibration information defining a relative position of each of said at least two cameras;

generating a three dimensional stereo reconstruction based upon plurality of frames and said plurality of calibration information;

using said computer, at least a portion of said plurality of blendshapes, and at least a portion of said three dimensional stereo reconstruction, determine a correspondence between each of said plurality of vertices in each of said plurality of blendshapes with a position on said three dimensional stereo reconstruction on a frame by frame basis;

executing an optimization process, within said computer, for generating an animated set of blendshapes, wherein said optimization process applies to a frame a first fitting process to yield a first set of weighted blendshapes and applies to said frame a direction of motion regularization process to yield a second set of weighted blendshapes, wherein the first set of weighted blendshapes is modified during the direction of motion regularization process to yield the second set of weighted blendshapes and wherein the direction of motion regularization process comprises constraining a direction of an offset of one of the plurality of blendshapes relative to a direction of an offset of a blendshape adjacent to the one of the plurality of blendshapes; and repeating the optimization process for a predetermined number of iterations to yield a final set of weighted blendshapes.

2. The computer-implemented method of claim 1 wherein each one of the plurality of blendshapes comprises a same number of vertices.

3. The computer-implemented method of claim 2 wherein each one of the plurality of blendshapes has a minimum of 1,000 vertices.

4. The computer-implemented method of claim 1 wherein said correspondence is determined by using said computer to interpolate each of said plurality of blendshapes linearly and determine a closest point on the three dimensional stereo reconstruction for each vertex in the each of the plurality of blendshapes.

5. The computer-implemented method of claim 1 wherein each of said plurality of blendshapes is generated by a computer-implemented method for generating and dynamically modifying a blendshape.

6. The computer-implemented method of claim 5 wherein the computer-implemented method for generating and dynamically modifying the blendshape comprises acquiring from a storage unit a plurality of template blendshapes, wherein each template blendshape is defined by data representative of the plurality of vertices and relationships between said vertices that, when rendered onto a display, visually represent at least one facial expression;

acquiring a plurality of facial expression measurements, wherein each facial expression measurement is defined by data representative of at least one facial expression captured from a physical performance by an actor; and using at least a portion of said plurality of facial expression measurements to generate an initial blendshape.

7. The computer-implemented method of claim 6 wherein the computer-implemented method for generating and dynamically modifying the blendshape further comprises executing an iterative optimization process, wherein said iterative optimization process applies to the initial blendshape a plurality of transformations based upon a first variable associated with a degree of sparseness, a second variable associated with a degree of temporal smoothness, a third variable associated with a degree of deformation regularization, and a fourth variable associated with a degree of the direction of motion regularization and wherein said iterative optimization process iteratively adjusts each of said first, second, third, and fourth variable to generate each of said plurality of blendshapes.

8. The computer-implemented method of claim 7 further comprising displaying an icon on a display, wherein said icon is adapted to be manipulated and wherein, upon a manipulation, the first variable is modified, thereby causing the degree of sparseness to increase or decrease.

9. The computer-implemented method of claim 7 further comprising displaying an icon on a display, wherein said icon is adapted to be manipulated and wherein, upon a manipulation, the second variable is modified, thereby causing the degree of temporal smoothness to increase or decrease.

10. The computer-implemented method of claim 7 further comprising displaying an icon on a display, wherein said icon is adapted to be manipulated and wherein, upon a manipulation, the third variable is modified, thereby causing the degree of deformation regularization to increase or decrease.

11. The computer-implemented method of claim 7 further comprising displaying an icon on a display, wherein said icon is adapted to be manipulated and wherein, upon a manipulation, the fourth variable is modified, thereby causing the degree of direction of motion regularization to increase or decrease.

12. A computer readable non-transitory medium comprising a plurality of executable programmatic instructions wherein, when said plurality of executable programmatic instructions are executed by a processor, a process for animating a plurality of blendshapes within a graphical user interface rendered in a display is performed, said plurality of executable programmatic instructions comprising:

programmatic instructions, stored in said computer readable non-transitory medium, for acquiring from a storage unit the plurality of blendshapes, wherein each one of said plurality of blendshapes is defined by data representative of a plurality of vertices and relationships between said vertices that, when rendered onto said display, visually represent at least one facial expression;

programmatic instructions, stored in said computer readable non-transitory medium, for acquiring a plurality of frames from at least two cameras and a plurality of calibration information defining a relative position of each of said at least two cameras;

programmatic instructions, stored in said computer readable non-transitory medium, for generating a three dimensional stereo reconstruction based upon plurality of frames and said plurality of calibration information;

programmatic instructions, stored in said computer readable non-transitory medium, for using at least a portion of said plurality of blendshapes and at least a portion of said three dimensional stereo reconstruction to determine a correspondence between each of said plurality of vertices in each of said plurality of blendshapes with a position on said three dimensional stereo reconstruction on a frame by frame basis;

programmatic instructions, stored in said computer readable non-transitory medium, for executing an optimization process to generating an animated set of blendshapes, wherein said optimization process applies to a frame a first fitting process to yield a first set of weighted blendshapes and applies to said frame a direction of motion regularization process to yield a second set of weighted blendshapes, wherein the first set of weighted blendshapes is modified during the direction of motion regularization process to yield the second set of weighted blendshapes and wherein the direction of motion regularization process comprises constraining a direction of an offset of one of the plurality of blendshapes relative to a direction of an offset of a blendshape adjacent to the one of the plurality of blendshapes; and programmatic instructions, stored in said computer readable non-transitory medium, for repeating the optimization process for a predetermined number of iterations to yield a final set of weighted blendshapes.

13. The computer readable non-transitory medium of claim 12 wherein each one of the plurality of blendshapes comprises a same number of vertices.

14. The computer readable non-transitory medium of claim 12 wherein each one of the plurality of blendshapes has a minimum of 1,000 vertices.

15. The computer readable non-transitory medium of claim 12 wherein said correspondence is determined by interpolating each of said plurality of blendshapes linearly and determine a closest point on the three dimensional stereo reconstruction for each vertex in the each of the plurality of blendshapes.

16. The computer readable non-transitory medium of claim 12 wherein each of said plurality of blendshapes is generated by a computer-implemented method for generating and dynamically modifying a blendshape.

17. The computer readable non-transitory medium of claim 16 wherein the computer-implemented method for generating and dynamically modifying the blendshape comprises
acquiring from a storage unit a plurality of template blendshapes, wherein each template blendshape is defined by data representative of the plurality of vertices and relationships between said vertices that, when rendered onto a display, visually represent at least one facial expression;
acquiring a plurality of facial expression measurements, wherein each facial expression measurement is defined by data representative of at least one facial expression captured from a physical performance by an actor; and
using at least a portion of said plurality of facial expression measurements to generate an initial blendshape.

18. The computer readable non-transitory medium of claim 17 wherein the computer-implemented method for generating and dynamically modifying the blendshape further comprises executing an iterative optimization process, wherein said iterative optimization process applies to the initial blendshape a plurality of transformations based upon a first variable associated with a degree of sparseness, a second variable associated with a degree of temporal smoothness, a third variable associated with a degree of deformation regularization, and a fourth variable associated with a degree of the direction of motion regularization and wherein said iterative optimization process iteratively adjusts each of said first, second, third, and fourth variable to generate each of said plurality of blendshapes.

19. The computer readable non-transitory medium of claim 18 further comprising programmatic instructions, stored in said computer readable non-transitory medium, for displaying an icon on a display, wherein said icon is adapted to be manipulated and wherein, upon a manipulation, the first variable is modified, thereby causing the degree of sparseness to increase or decrease.

20. The computer readable non-transitory medium of claim 18 further comprising programmatic instructions, stored in said computer readable non-transitory medium, for displaying an icon on a display, wherein said icon is adapted to be manipulated and wherein, upon a manipulation, the second variable is modified, thereby causing the degree of temporal smoothness to increase or decrease.

21. The computer readable non-transitory medium of claim 18 further comprising programmatic instructions, stored in said computer readable non-transitory medium, for displaying an icon on a display, wherein said icon is adapted to be manipulated and wherein, upon a manipulation, the third variable is modified, thereby causing the degree of deformation regularization to increase or decrease.

22. The computer readable non-transitory medium of claim 18 further comprising programmatic instructions, stored in said computer readable non-transitory medium, for displaying an icon on a display, wherein said icon is adapted to be manipulated and wherein, upon a manipulation, the fourth variable is modified, thereby causing the degree of direction of motion regularization to increase or decrease.

* * * * *